United States Patent
Yoshida et al.

(10) Patent No.: US 10,237,432 B2
(45) Date of Patent: Mar. 19, 2019

(54) MEDIUM STORING PROGRAM EXECUTABLE BY IMAGE PROCESSING APPARATUS, IMAGE PROCESSING APPARATUS, AND IMAGE PROCESSING METHOD

(71) Applicant: BROTHER KOGYO KABUSHIKI KAISHA, Nagoya-shi, Aichi-ken (JP)

(72) Inventors: Akidi Yoshida, Nagoya (JP); Tomohiko Hasegawa, Okazaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/854,189

(22) Filed: Dec. 26, 2017

(65) Prior Publication Data

US 2018/0220020 A1   Aug. 2, 2018

(30) Foreign Application Priority Data

Jan. 27, 2017  (JP) ................. 2017-012808

(51) Int. Cl.
    *H04N 1/00* (2006.01)
(52) U.S. Cl.
    CPC ..... *H04N 1/00718* (2013.01); *H04N 1/00748* (2013.01); *H04N 2201/0081* (2013.01)
(58) Field of Classification Search
    CPC .................................. H04N 1/00718
    USPC ....................................... 358/1.15
    See application file for complete search history.

(56) References Cited

U.S. PATENT DOCUMENTS

| 2009/0231639 A1 | 9/2009 | Iwayama |
| 2013/0121595 A1 | 5/2013 | Kawatani et al. |
| 2015/0256696 A1 | 9/2015 | Wada et al. |
| 2017/0264782 A1* | 9/2017 | Hashimoto ........ H04N 1/00005 |

FOREIGN PATENT DOCUMENTS

| JP | 4238749 B2 | 3/2009 |
| JP | 2009218953 A | 9/2009 |
| JP | 2013106160 A | 5/2013 |
| JP | 2015170927 A | 9/2015 |

* cited by examiner

*Primary Examiner* — Jacky X Zheng
(74) *Attorney, Agent, or Firm* — Scully, Scott, Murphy & Presser, PC

(57) ABSTRACT

A program stored in a non-transitory computer-readable medium causes an image processing apparatus to execute: read image data acquisition processing of acquiring read image data which is generated by optically reading a document and represents a read image including the document; line identification processing of identifying candidate lines which are candidates of lines representing edges of the document through analysis of the read image; and document information identification processing of identifying document information including at least one of a candidate line which represents at least a part of the edges of the document in the read image and an inclination of the document relative to the read image, by using a reference line formed from at least one of the candidate lines identified.

20 Claims, 11 Drawing Sheets

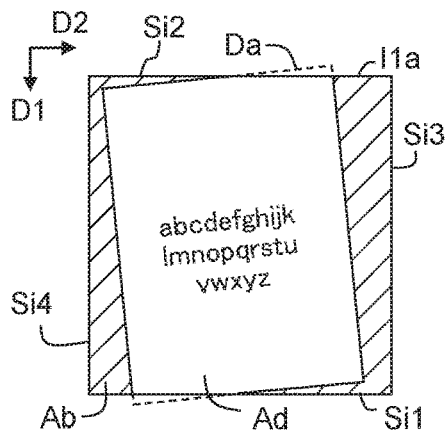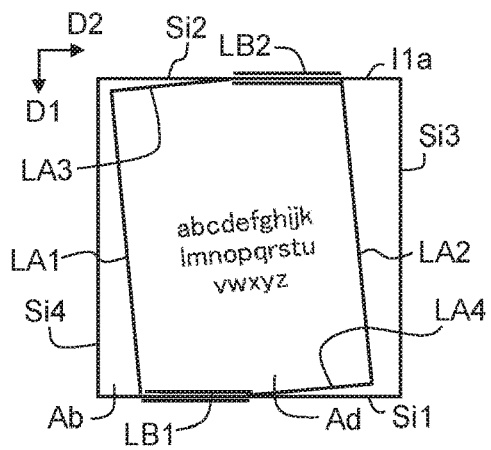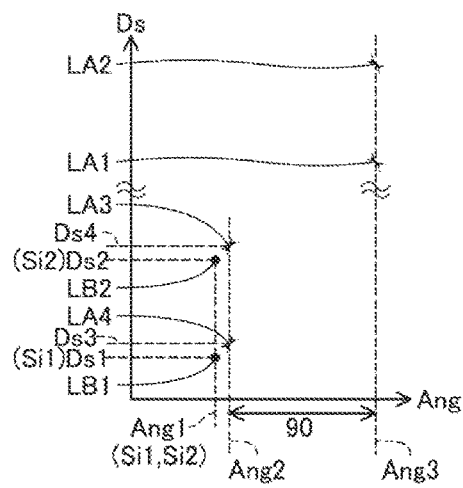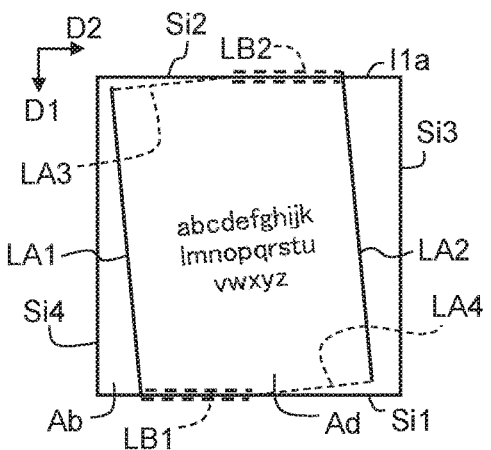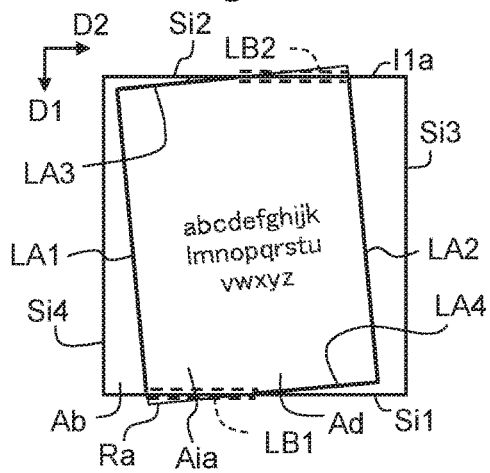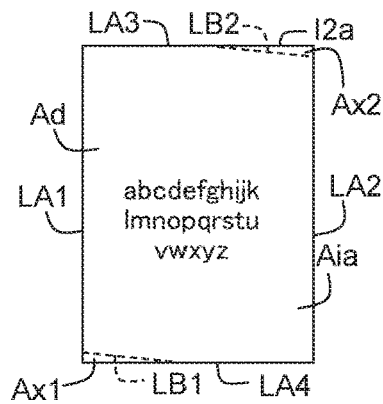

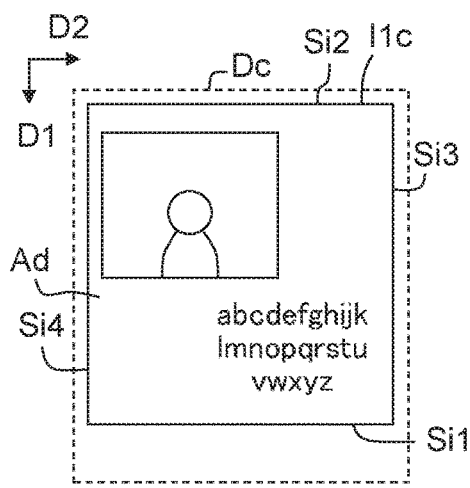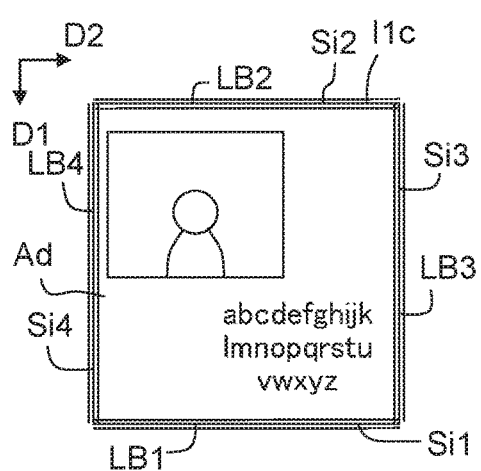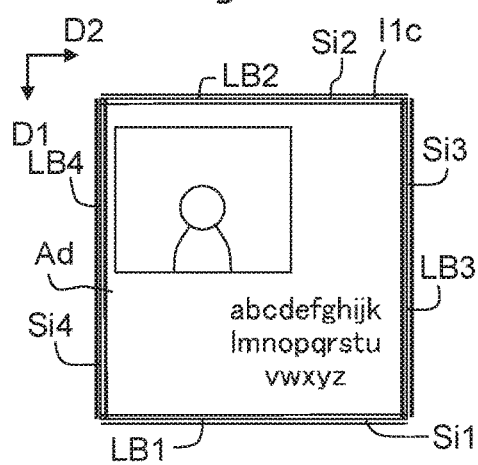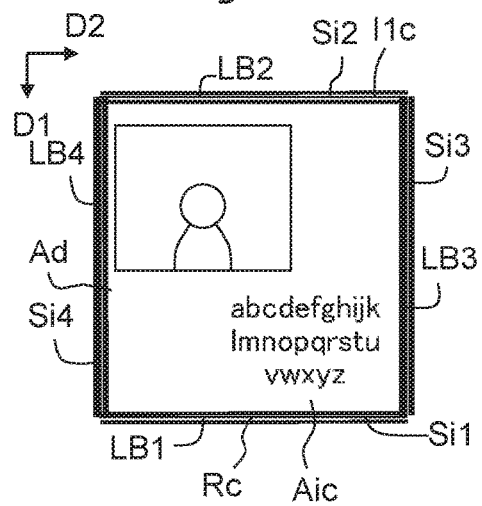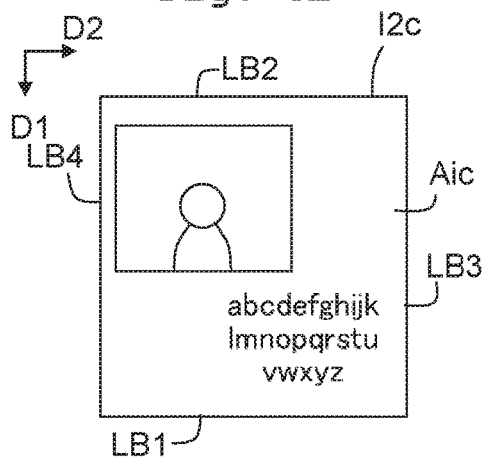

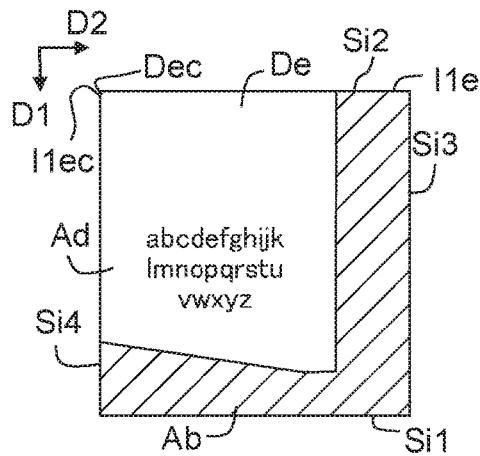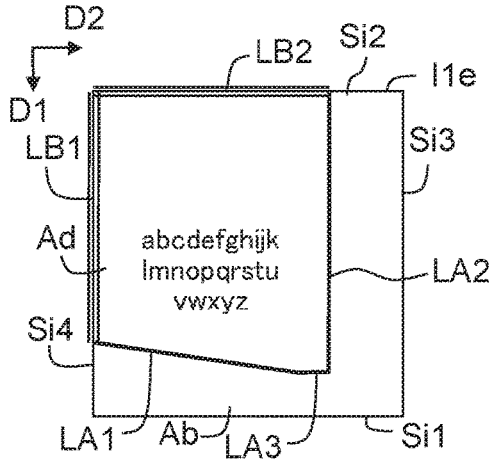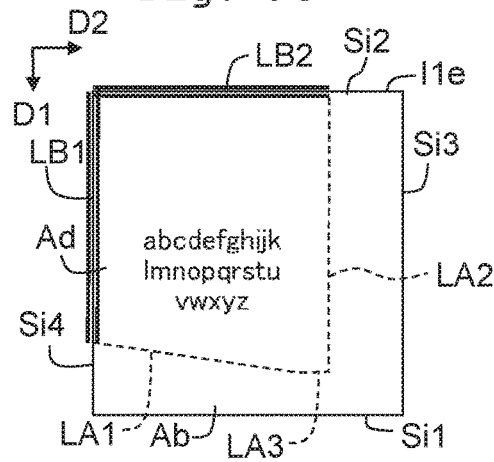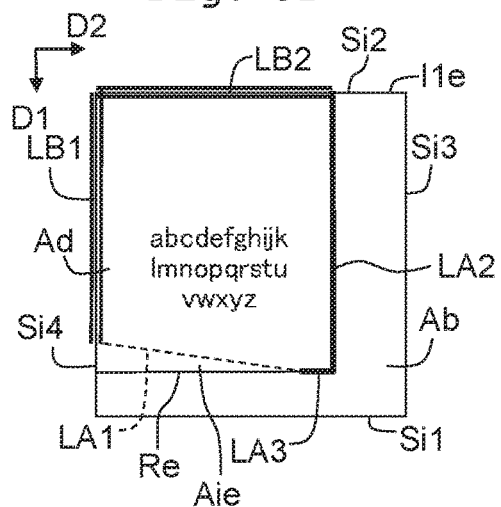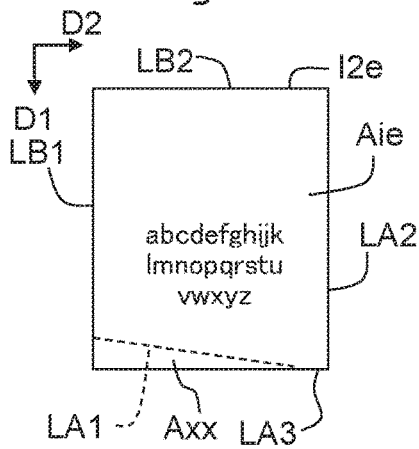

MEDIUM STORING PROGRAM EXECUTABLE BY IMAGE PROCESSING APPARATUS, IMAGE PROCESSING APPARATUS, AND IMAGE PROCESSING METHOD

CROSS REFERENCE TO RELATED APPLICATION

The present application claims priority from Japanese Patent Application No. 2017-012808 filed on Jan. 27, 2017, the disclosure of which is incorporated herein by reference in its entirety.

TECHNICAL FIELD

The present application relates to image processing using image data which generated by optically reading a document.

BACKGROUND

Image data representing an image is typically generated by using an image reading apparatus, such as a scanner. The image includes a document area representing a document. There is known a technology in which edge candidate lines, which are candidates of lines corresponding to edges of the document area, are calculated through Hough transform, a least-square technique, or the like based on coordinate values of edge candidate pixels in the image represented by the image data, and an inclination of the document area is calculated based on the edge candidate lines calculated. Further, for the purpose of improving accuracy of detection of the inclination of the document, there is known a method of selecting two sides orthogonal to each other or two sides parallel to each other of the sides of the document to detect the inclination of the document.

SUMMARY

In some cases, a part of the document extends beyond an end of a read image represented by the image data. This may make it hard to appropriately calculate the inclination of the document relative to the read image. Such a problem is applied not only to a case in which the inclination of the document is calculated but also to a case in which a line representing at least a part of the edges of the document in the read image is identified.

An object of the present teaching is to provide a technology that appropriately identifies document information including at least one of a line which represents at least a part of edges of a document and an inclination of the document, when a part of the document extends beyond an end of a read image.

According to an aspect of the present teaching, there is provided a non-transitory computer-readable medium storing a program executable by a processor of an image processing apparatus that, when executed by the processor of the image processing apparatus, causes the image processing apparatus to execute: read image data acquisition processing of acquiring read image data which is generated by optically reading a document and represents a read image including the document; line identification processing of identifying candidate lines which are candidates of lines representing edges of the document through analysis of the read image; and document information identification processing of identifying document information including at least one of a candidate line which represents at least a part of the edges of the document in the read image and an inclination of the document relative to the read image, by using a reference line formed from at least one of the candidate lines identified, wherein the document information identification processing includes: first determination processing of determining whether a first-kind reference line group including at least one inside line is selectable from among the candidate lines, the at least one inside line being a candidate line running inside ends of the read image; first identification processing of identifying the document information by using the first-kind reference line group, in a case that it is determined that the first-kind reference line group is selectable; and second identification processing of identifying the document information by using a second-kind reference line group which includes at least one end line of the candidate lines, in a case that it is determined that the first-kind reference line group is not selectable, the at least one end line being a candidate line which forms one of the ends of the read image, a ratio of a total number of the at least one end line to a total number of the candidate lines included in the second-kind reference line group being higher than a ratio of the total number of the at least one end line to a total number of the candidate lines included in the first-kind reference line group.

The above configuration can appropriately identify the document information when a part of the document extends beyond one of the ends of the read image.

The technology disclosed in the present specification can be achieved in a variety of aspects. For example, the technology can be achieved in aspects including an image processing method, an image processing apparatus, a computer program for achieving the function of the method or the apparatus, and the like.

BRIEF DESCRIPTION OF THE DRAWINGS

FIGS. 3A to 3F are illustrative views of a first example of a read image.

FIGS. 6A to 6E are illustrative views of a third example of the read image.

FIGS. 9A to 9E are illustrative views of a fifth example of the read image.

DESCRIPTION OF THE EMBODIMENTS

First Embodiment

Figure 1A:
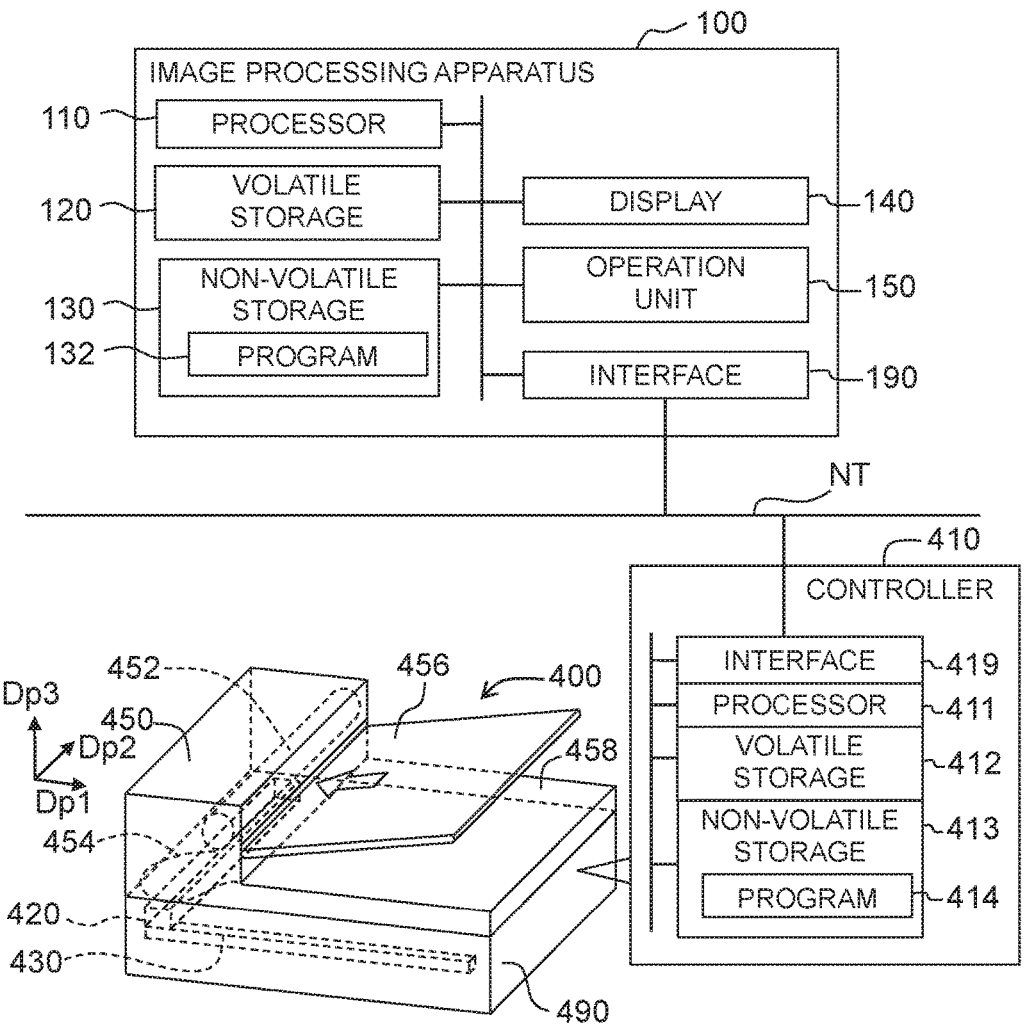
FIGS. 1A and 1B are illustrative views of an image processing system.

As depicted in FIG. 1A, an image processing system according to a first embodiment of the present teaching includes an image processing apparatus 100 and a scanner 400. The image processing apparatus 100 and the scanner 400 are connected to a network NT and they can communicate with each other.

The image processing apparatus 100 is, for example, a personal computer (e.g., a desktop or a tablet). The image processing apparatus 100 includes a processor 110, a volatile storage 120, a non-volatile storage 130, a display 140 displaying an image, an operation unit 150 receiving user operation, and an interface 190. Those parts or components are connected to each other via a bus.

The processor 110, which may be a CPU, performs data processing. The volatile storage 120 may be a DRAM. The non-volatile storage 130 may be a flash memory. The non-volatile storage 130 stores a program 132. The processor 110 executes processing of executing the program 132 to cause the scanner 400 to read a document and generating output image data representing the read document (details are described below). The program 132 may be a scanner driver for controlling the scanner 400. The processor 110 temporarily stores a variety of intermediate data to be used for execution of the program 132 in a storage (e.g., any of the volatile storage 120 and the non-volatile storage 130). The program 132 is provided, for example, by a manufacturer of the scanner 400.

The display 140, which may be a liquid crystal display, displays an image. In place of the liquid crystal display, any other unit displaying an image, such as an LED display or an organic light emitting (EL) display, may be used. The operation unit 150, which may be a touch panel disposed on the display 140, receives user operation. In place of the touch panel, any other unit to be operated by a user, such as buttons and a lever, may be used. The user operates the operation unit 150 to input a variety of instructions to the image processing apparatus 100.

The interface 190 is an interface to communicate with other devices (e.g., a USB interface, a wired LAN interface, and a wireless interface of IEEE802.11). In the first embodiment, the interface 190 is a wired network interface or a wireless network interface. The interface 190 is connected to the network NT.

Figure 1B:
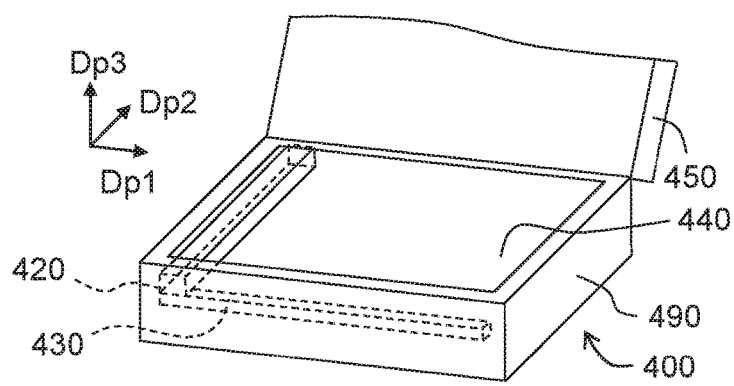

FIGS. 1A and 1B each depict a perspective view of the scanner 400. In FIGS. 1A and 1B, a first direction Dp1 and a second direction Dp2 indicate a horizontal direction, and a third direction Dp3 indicates a vertical upward direction. The first direction Dp1 is orthogonal to the second direction Dp2. In the following, the first direction Dp1 is also referred to as "+Dp1 direction" and a direction opposite to the first direction Dp1 is also referred to as "−Dp1 direction"; the second direction Dp2 is also referred to as "+Dp2 direction" and a direction opposite to the second direction Dp2 is also referred to as "−Dp2 direction"; and the third direction Dp3 is also referred to as "+Dp3 direction" and a direction opposite to the third direction Dp3 is also referred to as "−Dp3 direction". The third direction Dp3 is also referred to as an upward direction Dp3.

The scanner 400 includes a body 490 and a conveyance unit 450. An upper portion of the body 490 can be opened and closed with the conveyance unit 450 attached thereto. FIG. 1A depicts the scanner 400 in which the upper portion of the body 490 is closed with the conveyance unit 450, and FIG. 1B depicts the scanner 400 in which the conveyance unit 450 is moved in the upward direction Dp3 to open the upper portion of the body 490.

The body 490 includes a controller 410, a reader 420 optically reading a document, and a movement unit 430 that moves the reader 420 in the first direction Dp1. The movement unit 430 includes an unillustrated power source (e.g., an electric motor) that moves the reader 420. The conveyance unit 450, which is also called an Auto Document Feeder, conveys a document. In the first embodiment, the conveyance unit 450 includes a feed tray 456 on which a document to be scanned is placed, a conveyance roller 452 that conveys the document on the feed tray 456, an unillustrated power source (e.g., an electric motor) rotating the conveyance roller 452, and a discharge tray 458 on which the document scanned is placed.

A platen 440 is provided on an upper surface of the body 490 (FIG. 1B). The platen 440 appears by moving the conveyance unit 450 in the upward direction Dp3. The platen 440 is a substantially rectangular mount that is surrounded by two sides parallel to the first direction Dp1 and two sides parallel to the second direction Dp2. The platen 440 is made by using a transparent plate (e.g., a glass plate). The platen 440 is also referred to as a flat bed.

The reader 420 is disposed below the platen 440. The reader 420 is an optical sensor that optically reads a document. The reader 420 includes photoelectric conversion elements (also simply referred to as optical elements), such as CCD or CMOS, which are arranged in the second direction Dp2. The reader 420 optically reads a document on the platen 440 to output a signal representing the read document.

The controller 410 controls the reader 420, the movement unit 430, and the conveyance unit 450. The controller 410 may be a computer including a processor 411 (e.g., a CPU) performing data processing, a volatile storage 412 (e.g., a DRAM), a non-volatile storage 413 (e.g., a flash memory), and an interface 419. The parts or components of the controller 410 are connected to each other by a bus. The non-volatile storage 413 previously stores a program 414. The processor 411 executes the program 414 to control the reader 420, the movement unit 430, and the conveyance unit 450. The interface 419 is an interface (e.g., a USB interface, a wired LAN interface, or a wireless interface of IEEE802.11) to communicate with other devices. In the first embodiment, the interface 419 is a wired network interface or a wireless network interface. The interface 419 is connected to the network NT.

The scanner 400 can work in a mode in which the conveyance unit 450 (FIG. 1A) is used to read a document (referred to as a conveyance mode) or in a mode in which the platen 440 (FIG. 1B) is used to read a document without using the conveyance unit 450 (referred to as a platen mode). The processor 411 of the controller 410 controls the scanner 400 by the conveyance mode or the platen mode based on an instruction from the image processing apparatus 100.

When a document is read by the conveyance mode, as depicted in FIG. 1A, the scanner 400 is used in a state where the upper portion of the body 490 is closed with the conveyance unit 450 (i.e., the conveyance unit 450 is positioned on the platen 440). The processor 411 of the controller 410 controls the movement unit 430 to place the reader 420 at a predefined position (e.g., an end of the platen 440 in the direction opposite to the first direction Dp1). Then, the processor 411 rotates the conveyance roller 452 of the conveyance unit 450 to convey a document. This allows the document to move along a route 454 from the feed tray 456 to the discharge tray 458 via a position on the platen 440 facing the reader 420. The processor 411 causes the reader 420 to read the document moving relative to the reader 420 without moving the reader 420 (i.e., the optical elements). Accordingly, the document is entirely read. The reader 420 outputs a signal representing the image read by the reader 420 (referred to as a "read image"). The processor 411 generates read image data representing the read image by use of the signal from the reader 420, and transmits the read image data generated to the image processing apparatus 100.

When a document is read by using the platen 440, the document is placed on the platen 440. The processor 411 of the controller 410 controls the movement unit 430 to move the reader 420 from the end of the platen 440 in the direction opposite to the first direction Dp1 to an end of the platen 440 in the first direction Dp1. The processor 411 causes the reader 420 to read the document while moving the reader 420 (i.e., the optical elements) relative to the document in the first direction Dp1 without moving the document. Accordingly, the document is entirely read. The processor 411 generates read image data representing the read image by use of a signal from the reader 420, and transmits the read image data generated to the image processing apparatus 100.

Figure 2:
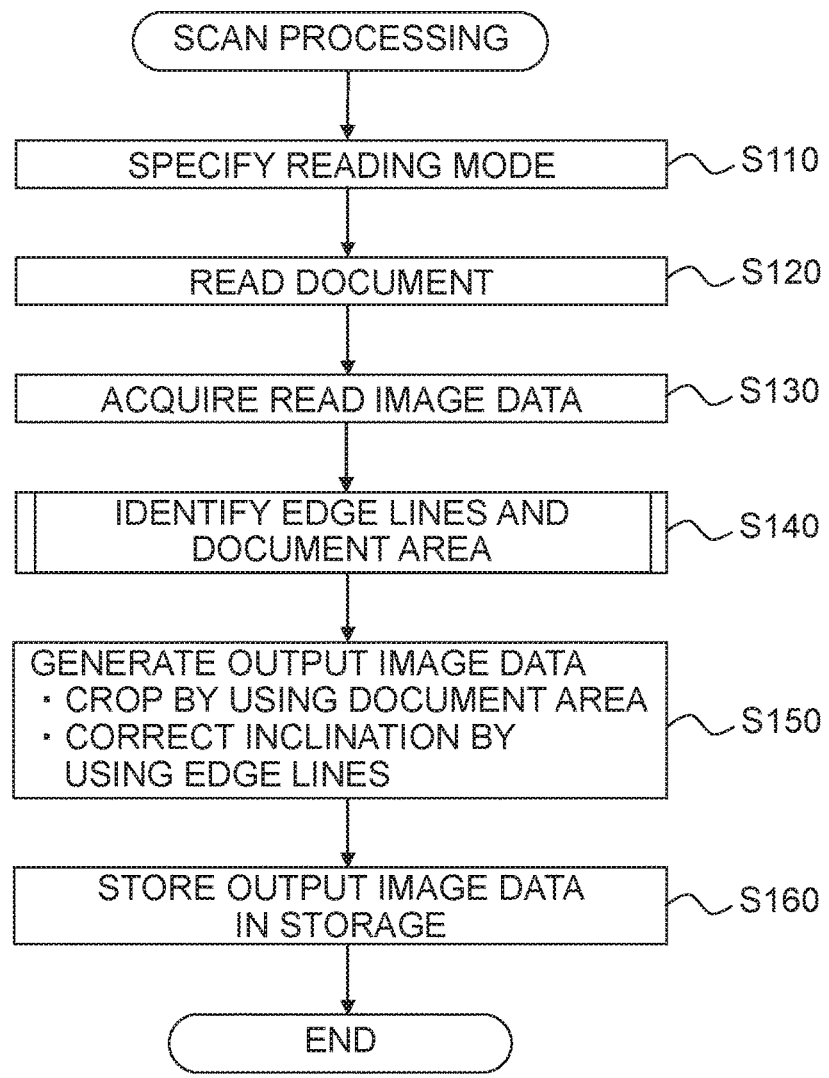
FIG. 2 is a flowchart indicating an example of scan processing.

In the first embodiment, the processor 110 of the image processing apparatus 100 as a scanner driver executes scan processing indicated in FIG. 2. In the scan processing, read image data is acquired by causing the scanner 400 to read a document, and the read image data acquired is used to generate output image data representing a document of which inclination or the like has been corrected. The user inputs a start instruction of the scan processing by operating the operation unit 150. The start instruction includes an instruction specifying a reading mode. The processor 110 starts the processing indicated in FIG. 2 in response to the start instruction input.

In S110, the processor 110 specifies the reading mode based on the start instruction input by the user (referred to as a specified mode). In S120, the processor 110 transmits, to the scanner 400, an instruction for causing the scanner 400 to read a document in the specified mode. The processor 411 of the controller 410 of the scanner 400 reads the document in the specified mode in response to the instruction from the image processing apparatus 100, generates read image data by use of a signal from the reader 420, and transmits the read image data generated to the image processing apparatus 100. In S130, the processor 110 of the image processing apparatus 100 acquires the read image data from the scanner 400. A variety of data formats may be applicable to the read image data. In the first embodiment, the read image data is bitmap data of red R, green G, and blue B.

As depicted in FIG. 3A, a read image I1a has a rectangular shape formed from two sides Si3 and Si4 extending in a first direction D1 and two sides Si1 and Si2 extending in a second direction D2. In FIG. 3A, the first direction D1 is a vertical direction, and the second direction D2 is a horizontal direction. In the following, the first direction D1 is also referred to as "+D1 direction" and a direction opposite to the first direction D1 is also referred to as "−D1 direction"; the second direction D2 is also referred to as "+D2 direction" and a direction opposite to the second direction D2 is also referred to as "−D2 direction". For the document and the image, the +D1 direction is also referred to as a lower direction; the −D1 direction is also referred to as an upper direction; the +D2 direction is also referred to as a right direction; and the −D2 direction is also referred to as a left direction. In the first embodiment, the shape and size of a read area corresponding to the read image are same as the entire shape and size of the platen 440, regardless of the reading mode. The shape and size of the read area corresponding to the read image, however, may be specified by the user.

The read image I1a is an exemplary image that is generated by reading a rectangular document Da. The read image I1a represents a foreground area Ad representing an object such as the document Da, and a background area Ab representing no object. In the first embodiment, the background area Ab may represent a surface (i.e., a lower surface) of the conveyance unit 450 (FIG. 1A) in the −Dp3 direction. In FIG. 3A, the background area Ab is hatched. The document Da is obliquely inclined to the read image I1a, and a part of the document Da extends beyond the read image I1a. In FIG. 3A, a lower side of the document Da partially extends beyond the lower side Si1 of the read image I1a, and an upper side of the document Da partially extends beyond the upper side Si2 of the read image I1a.

In S140 of FIG. 2, the processor 110 executes processing of identifying edge lines representing edges of the document in the read image and a document area that is a rectangular interior area formed from the edge lines (details described below). In S150, the processor 110 extracts the document area from the read image and generates output image data representing the document by correcting an inclination of the document area extracted by use of the edge lines (processing of extracting a part of the image to remove remaining parts of the image is also referred to as cropping). As depicted in FIG. 3F, an output image 12a represented by the output image data does not represent the background area Ab in the read image I1a of FIG. 3A but represents the foreground area Ad extracted from the read image I1a. The inclination of the foreground area Ad is corrected. Any data format may be applicable to the output image data. In the first embodiment, the processor 110 generates the output image data in JPEG format. The processor 110 may generate the output image data in a data format specified by the user.

In S160 of FIG. 2, the processor 110 stores the output image data generated in a storage. Then, the processor 110 ends the processing of FIG. 2. In the first embodiment, the processor 110 stores the output image data in an internal storage (e.g., the non-volatile storage 130) of the image processing apparatus 100. The processor 110 may store the output image data in an external storage apparatus (e.g., an unillustrated USB memory) connected to the image processing apparatus 100. The processor 110 may store the output image data in a storage selected by the user. The user can freely use the output image data stored in the storage selected by the user.

The processing of identifying the edge lines and the document area (FIG. 2: S140) is explained below with reference to FIGS. 4A and 4B. In S210, the processor 110 separates the foreground area representing the document from the background area through analysis of the read image. Any known method may be used as the separation method. In the first embodiment, the background area of the read image generated by the scanner 400 is represented by using a predefined color (e.g., black). The processor 110 identifies an area having a predefined color used for a background color range (e.g., a color range using black) as the background area, and identifies an area using any other color as the foreground area. The foreground area Ad and the background area Ab of FIG. 3A represent the areas separated from each other in S210.

In S220, the processor 110 analyzes the read image to identify contour pixels representing contours of the foreground area. Any known method may be used as the method identifying each contour pixel. For example, the processor 110 identifies a pixel, of the pixels of the foreground area, adjacent to a pixel of the background area, as the contour pixel. For example, when one or more pixel(s), among nine pixels of 3×3 with a target pixel of the foreground area being its center, is/are the pixel(s) of the background area, the target pixel is identified as the contour pixel. Further, the processor 110 identifies a pixel, of the pixels of the foreground area, representing an end of the read image, as the contour pixel. This enables the processor 110 to identify the contour pixels of every edge of the foreground area Ad in the read image, when a part of the document Da extends beyond the read image I1a, like the read image I1a in FIG. 3A. The processor 110 may identify the contour pixels by using an edge detection filter, such as a Sobel filter.

In S230, the processor 110 identifies candidate lines that are candidates of lines representing the edges of the document. The processor 110 adopts each line represented by the contour pixels identified in S220, as the candidate line. FIG. 3B depicts exemplary candidate lines identified in the read image I1a. In FIG. 3B, six candidate lines LA1 to LA4, LB1, and LB2 are identified. The four candidate lines LA1 to LA4 are in contact with the background area Ab without forming the ends of the read image I1a. The four candidate lines LA1 to LA4 run on the inside of the read image I1a. The two candidate lines LB1 and LB2 form the ends of the read image I1a. The candidate lines LB1 and LB2 represent parts of the document Da extending beyond the read image I1a. In the following, the candidate lines running on the inside of the ends of the read image (e.g., the lines LA1 to LA4) are also referred to as inside lines, and the candidate lines forming the ends of the read image (e.g., the lines LB1 and LB) are also referred to as end lines. Reference signs starting from "LA" are used for the inside lines, and reference signs starting from "LB" are used for the end lines.

Any known method can be used as the method of identifying the candidate lines. For example, the processor 110 identifies each candidate line by Hough transform using the contour pixels. FIG. 3C is a graph indicating an exemplary result of Hough transform executed on the read image I1a. The horizontal axis indicates an angle Ang and the vertical axis indicates a distance Ds. A combination of the angle Ang and the distance Ds represents a line on the read image I1a. The angle Ang is an angle between the line and a reference direction (not depicted) on the read image I1a. The distance Ds is a distance between the line and a reference point (not depicted) on the read image I1a.

The processor 110 executes Hough transform to calculate the total number of contour pixels (hereinafter referred to as "the number of contour pixels") overlapping with the line, which is identified by each combination of the angle Ang and the distance Ds. When the number of contour pixels is large, the line identified by the angle Ang and the distance Ds and mapped to the number of contour pixels may represent a contour formed from many contour pixels. Namely, the line identified by the angle Ang and the distance Ds in the read image (more specifically, the line represented by multiple contour pixels) is longer, as the number of contour pixels is larger. The processor 110 divides a range of the angle Ang into multiple partial ranges, divides a range of the distance Ds into multiple partial ranges, and calculates the number of contour pixels for each combination (referred to as a cell) of the partial area of the angle Ang and the partial area of the distance Ds. A center value of the partial areas of the angle Ang may be adopted as the angle Ang that represents the cell. Similarly, a center value of the partial areas of the distance Ds may be adopted the distance Ds that represents the cell.

In FIG. 3C, a combination of the angle Ang and the distance Ds including many contour pixels is represented by each black dot. Specifically, FIG. 3C includes four black dots representing the four candidate lines LA1 to LA4 and two black dots representing the two candidate lines LB1 and LB2. A first angle Ang1 in FIG. 3C is an angle Ang of lines (here, lines parallel to the second direction D2) that represent the sides Si1 and Si2 of the read image I1a (FIG. 3B). A first distance Ds1 is a distance Ds of the line representing the side Si1 of the read image I1a. A second distance Ds2 is a distance Ds of the line representing the side Si2 of the read image I1a. The contour pixels forming the candidate line LB1 that overlaps with the side Si1 increases the number of contour pixels of the combination (cell) of the first angle Ang1 and the first distance Ds1 that represents the side Si1. Similarly, the contour pixels forming the candidate line LB2 that overlaps with the side Si2 increases the number of contour pixels of the combination of the first angle Ang1 and the second distance Ds2 that represents the side Si2.

Since the document Da is inclined to the read image I1a, the candidate line LA3 that is positioned on the upper side of FIG. 3B and the candidate line LA4 that is positioned on the lower side of FIG. 3B are inclined to the second direction D2. An angle Ang2 and a distance Ds4 in FIG. 3C represent an angle Ang and a distance Ds of a cell including many contour pixels representing the upper inside line LA3, and the angle Ang2 and a distance Ds3 represent an angle Ang and a distance Ds of a cell including many contour pixels representing the lower inside line LA4. In the first embodiment, the document Da has a substantially rectangular shape, and the inside line LA3 is parallel to the inside line LA4. Thus, in FIG. 3C, the angle Ang corresponding to the inside line LA3 is the same as the angle Ang corresponding to the inside line LA4 (here, the angle Ang2). Although the lower inside line LA4 extends along the side Si1 similarly to the lower end line LB1, the line LA4 is slightly inclined to the line LB1. Thus, in FIG. 3C, the angle Ang2 corresponding to the inside line LA4 is different from the first angle Ang1 corresponding to the end line LB1. The distance Ds3 corresponding to the inside line LA4 may be different from the distance Ds1 corresponding to the end line LB1. Although the upper inside line LA3 extends along the side Si2 similarly to the upper end line LB2, the line LA3 is slightly inclined to the line LB2. Thus, in FIG. 3C, the angle Ang2 corresponding to the inside line LA3 is different from the first angle Ang1 corresponding to the end line LB2. The distance Ds4 corresponding to the inside line LA3 may be different from the distance Ds2 corresponding to the end line LB2.

In FIG. 3C, an angle Ang3 represents an angle Ang of a cell including many contour pixels representing the left inside line LA1 (FIG. 3B). In the first embodiment, the document Da has a substantially rectangle shape. The left inside line LA1 (FIG. 3B) is parallel to the right inside line LA2. Thus, an angle Ang of a cell including many contour pixels representing the right inside line LA2 is the same as the angle Ang3 corresponding to the left inside line LA1. The distance Ds of the left inside line LA1 is different from the distance Ds of the right inside line LA2. In the first embodiment, the left candidate line LA1 and the right candidate line LA2 are orthogonal to the upper candidate line LA3 and the lower candidate line LA4. Thus, in FIG. 3C, the angle Ang3 corresponding to the left inside line LA1 and the right inside line LA2 is different from the angle Ang2 corresponding to the upper inside line LA3 and the lower inside line LA4 by 90°.

Figure 4A:
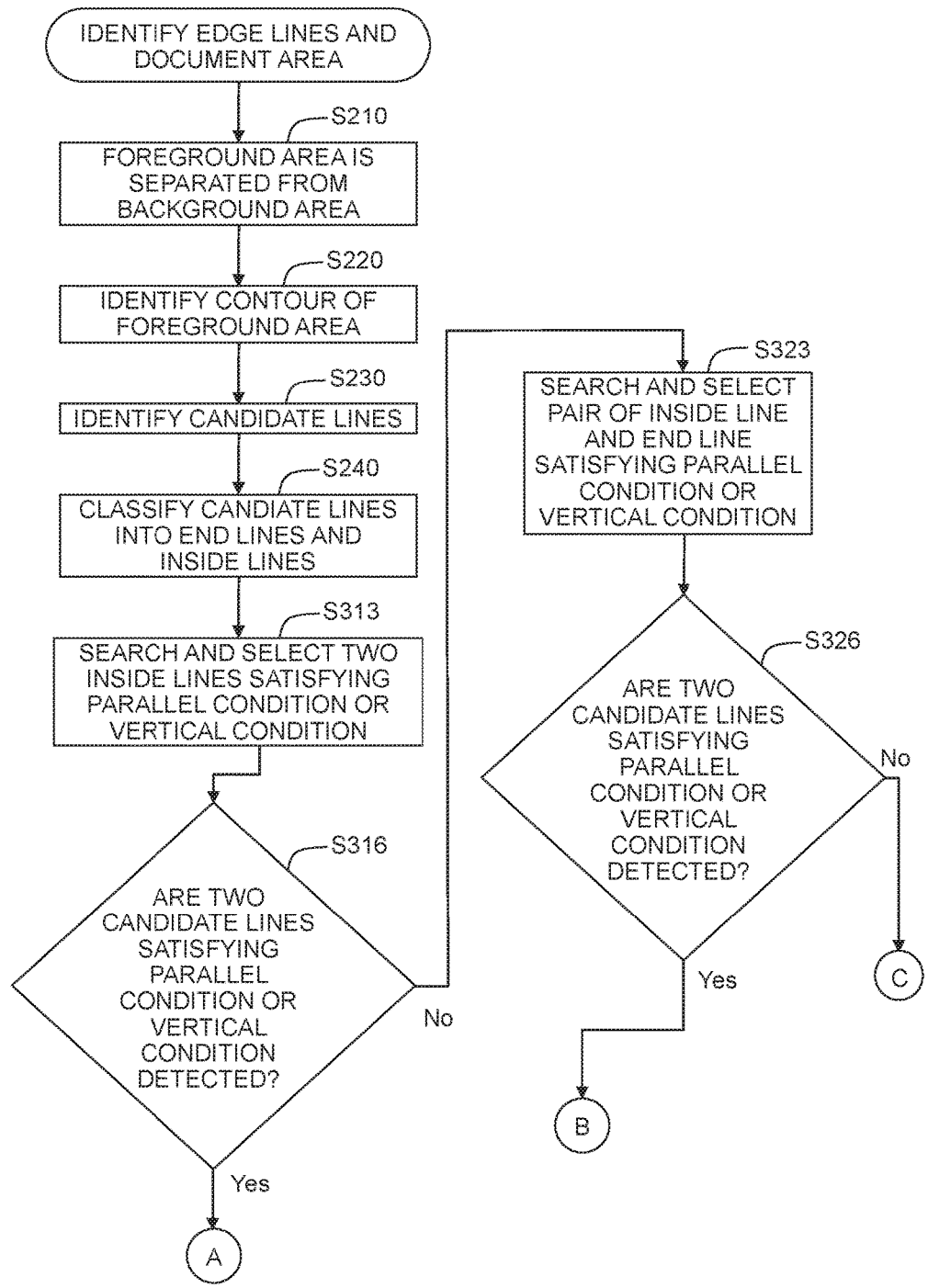
FIGS. 4A and 4B are a flowchart indicating an example of processing of identifying edge lines and a document area.

In S230 of FIG. 4A, the processor 110 generates the graph indicated in FIG. 3C by using the contour pixels identified in S220, and identifies the candidate lines, which are the candidates of lines representing the edges of the document, by using the generated graph. The processor 110 adopts, for example, a line identified by a combination of an angle Ang and a distance Ds representing a cell in which the number of contour pixels is the maximum (i.e., a local peak) and is not less than a predefined threshold value, as the candidate line. In the first embodiment, the threshold value of the number of contour pixels is determined in advance. The threshold value is set, for example, to the number of pixels corresponding to a length of 2 cm on the document Da. In FIG. 3C, the six lines LA1 to LA4, LB1, and LB2 are identified. The processor 110 may change the threshold value depending on the read image. For example, the processor 110 may adjust the threshold value so that the threshold value increases as the total number of contour pixels detected in the read image is larger.

The contour pixels representing one line may be assigned and distributed to multiple cells that differ in at least one of the angle Ang and the distance Ds. Those cells concentrate in a small area where the angles Ang slightly differ from each other and the distances Ds slightly differ from each other. When the contour pixels are distributed in the cells included in a range (referred to as a line distribution range) having a predefined size in which multiple contour pixels representing one line may be distributed, the processor 110 adopts one line mapped to one cell that represents a peak in the line distribution range, as the candidate line. When the total value of the number of contour pixels in the cells included in the line distribution range is not less than the threshold value of the number of contour pixels, the processor 110 may adopt one line corresponding to the peak in the line distribution range, as the candidate line.

In S240, the processor 110 classifies one or more candidate lines identified into the end line(s) and the inside line(s). In FIG. 3C, the combination of the angle Ang and the distance Ds of each line that represents each end (i.e., each of the four sides) of the read image is determined in advance. Of the combinations of the angles Ang and the distances Ds, the processor 110 classifies the candidate line, which is represented by the combination representing each end of the read image, into the end line, and classifies any other candidate line into the inside line.

In S313 of FIG. 4A, the processor 110 searches, among the candidate lines, a line pair made of two inside lines that satisfy a predefined parallel condition or a predefined vertical condition. Then, the processor 110 selects the line pair satisfying the parallel condition or the vertical condition as reference lines (referred also to as an inside reference pair) for identifying the edge lines representing the edges of the document. The parallel condition indicates that the two lines are in a parallel state determined in advance, and the vertical condition indicates that the two lines are in a vertical state determined in advance.

The parallel state determined in advance is a state in which an angle formed by the two lines (e.g., a smaller angle) is not more than a first permissible range. When the first permissible range is zero, the two lines in the parallel state are strictly parallel to each other. When the first permissible range is larger than zero but small, the two lines in the parallel state are substantially parallel to each other. The first permissible range is preferably not more than 5°, more preferably not more than 3°, most preferably not more than 1°.

The vertical state determined in advance is a state in which an absolute value of a difference between 90° and an angle formed by the two lines (e.g., a smaller angle) is not more than a second permissible range. When the second permissible range is zero, the two lines in the vertical state are strictly vertical to each other. When the second permissible range is larger than zero but small, the two lines in the vertical state are substantially vertical to each other. The second permissible range is preferably not more than 5°, more preferably not more than 3°, most preferably not more than 1°.

In FIG. 3B, two pairs (i.e., a line pair LA1 and LA2 and a line pair LA3 and LA4) are detected as candidates of the inside reference pair satisfying the parallel condition. Further, four pairs (i.e., a line pair LA1 and LA3, a line pair LA3 and LA2, a line pair LA2 and LA4, and a line pair LA4 and LA1) are detected as candidates of the inside reference pair satisfying the vertical condition. When multiple pairs are detected as the candidates, the processor 110 selects one pair from among the multiple pairs. A variety of methods may be used as the method of selecting one pair from among the multiple pairs. In the first embodiment, the processor 110 selects a pair having the largest total value of the number of contour pixels of the two candidate lines, that is, a pair having the longest total length. The bold lines in FIG. 3D depict two exemplary candidate lines (i.e., two inside lines) of the inside reference pair which are finally selected from the candidate lines in FIG. 3B. In that example, the two candidate lines LA1 and LA2 that are longer than other candidate lines are selected as the inside reference pair satisfying the parallel condition.

In S316 of FIG. 4A, the processor 110 determines whether the two inside lines (i.e., the inside reference pair) satisfying the parallel condition or the vertical condition are detected in S313. When the inside reference pair is detected (S316: Yes), the processor 110 identifies, in S350, the two candidate lines forming the reference pair detected, as the lines representing the edges of the document. In the following, one of the two candidate lines identified is also referred to as a first candidate line, and the other candidate line is also referred to a second candidate line. In FIG. 3D, the candidate lines LA1 and LA2 indicated by the bold lines are two exemplary candidate lines identified in S350.

In S370, the processor 110 identifies, as the lines representing the edges of the document, two additional candidate lines that form a rectangle by combining them with the first and second candidate lines. The bold lines in FIG. 3E indicate two exemplary additional candidate lines identified based on the first and second candidate lines LA1 and LA2 in FIG. 3D. In this example, the candidate lines LA3 and LA4 are identified as the two additional candidate lines that form the rectangle. In the following, one of the two additional candidate lines identified is also referred to as a third candidate line, and the other candidate line is also referred to as a fourth candidate line. In the following, the respective four candidate lines identified in S350 and S370 (i.e., the four candidate lines that are determined to represent the edges of the document) are also referred to as the edge lines.

In S370, the processor 110 assumes that the first and second candidate lines represent two sides of the four sides of the rectangle, and searches two candidate lines having positional relations that respectively correspond to the remaining two sides, from among the candidate lines. The two additional candidate lines are identified depending on the positional relation between the first candidate line and the second candidate line. For example, when the first and second candidate lines satisfy the parallel condition, candidate lines satisfying the vertical condition with respect to the first candidate line are identified as the third and fourth candidate lines. When the first and second candidate lines satisfy the vertical condition, a candidate line satisfying the vertical condition with respect to the first candidate line is identified as the third candidate line, and a candidate line satisfying the parallel condition with respect to the first candidate line is identified as the fourth candidate line. At least one of the third candidate line and the fourth candidate line may be identified based on the positional relation with respect to the second candidate line (i.e., the vertical direction or the parallel condition). In the first embodiment, the processor 110 identifies each of the third and fourth candidate lines by preferentially selecting a candidate line having more contour pixels from among the candidate lines having appropriate positional relations based on the first and second candidate lines.

The processor 110 may search the third and fourth candidate lines from among all the candidate lines identified in S230 (FIG. 4A).

As described above, the four edge lines are identified in S350 and S370. In FIG. 3E, the four candidate lines LA1 to LA4 are identified as the edge lines. In S380, the processor 110 identifies an interior area of the rectangle formed from the four edge lines, as the document area representing the document. In FIG. 3E, an interior area Aia of a rectangle Ra that is formed by extending the four candidate lines LA1 to LA4 is identified as the document area. The document area Aia is an area representing the document Da (FIG. 3A). As described in FIG. 3A, a part of the document Da extends beyond the read image I1a. Thus, a part of the document area Aia (FIG. 3E) also extends beyond the read image I1a.

Figure 4B:
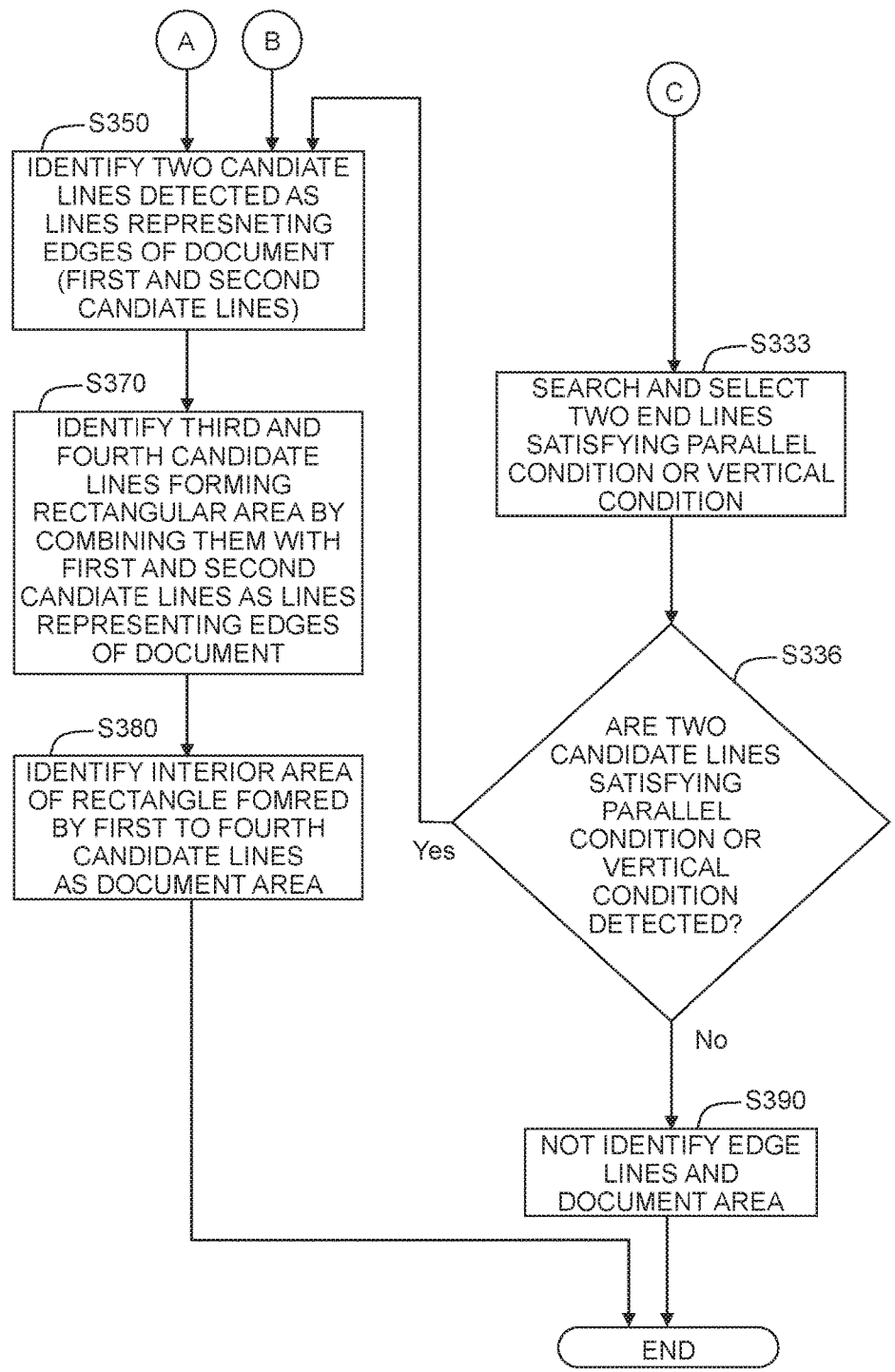

When the four edge lines and the document area are identified, the processor 110 ends the processing of FIGS. 4A and 4B (i.e., S140 of FIG. 2). It can be said that the processor 110 determines in S316 whether the inside reference pair to be used as a reference of the edge lines can be selected.

In S150 of FIG. 2, the processor 110 generates output image data representing the document by use of the four edge lines identified in S140 and the document area. As described above, in the first embodiment, the document area is extracted from the read image and the inclination of the document area is corrected based on the edge lines. In FIG. 3E, the document area Aia is extracted from the read image I1a. Then, the document area Aia is rotated so that the four edge lines form the four edges of the rectangular output image. The image obtained by the above processing is the output image. The edges of the output image generated described above correspond to the rectangle formed from the four edge lines. For example, the edges of the output image I2a depicted in FIG. 3F correspond to the rectangle Ra of FIG. 3E.

As described above while referring to FIG. 3E, a part of the rectangle Ra formed from the four edge lines may extend beyond the read image I1a. As depicted in FIG. 3F, an area Ax1 and an area Ax2 of the output image I2a are not included in the foreground area Ad (FIGS. 3A and 3E) of the read image I1a. Namely, parts of the output image (referred to as omission areas) may be omitted from the foreground area. In the first embodiment, when the document area includes the omission area, the processor 110 corrects an image of the omission area to make a difference between the image of the omission area and blanks of the document small. A variety of methods may be used as the method for such correction. In the first embodiment, the processor 110 corrects the image of the omission area so that the image of the omission area represents a solid image having a color for the blanks of the document. A predefined color (e.g., white) is used as the color for the blanks. Or, the processor 110 may calculate the color for blanks of the document by analyzing the foreground area.

Figure 5A:
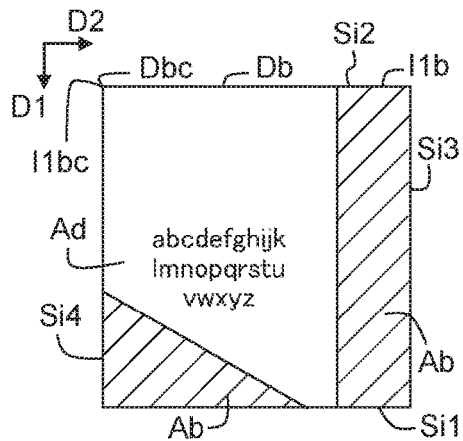
FIGS. 5A to 5E are illustrative views of a second example of the read image.

Next, the processing performed when it is not determined in S316 of FIG. 4A (S316: No) that the inside reference pair can be selected from among the candidate lines, is explained. A read image I1b of FIG. 5A is an exemplary read image that is generated by reading a rectangular document Db that is partially folded. The read image I1b represents a foreground area Ad representing the document Db and a background area Ab. In FIG. 5A, the document Db is not inclined to the read image I1b. An upper left corner Dbc of the document Db overlaps with an upper left corner I1bc of the read image I1b. In the read image I1b, the length of the document Db in the first direction D1 is the same as the length of the read image I1b in the first direction D1. Then, scan processing is performed in a state where a lower left corner of the rectangular document Db is folded. This makes an almost triangular portion, of the read image I1b, corresponding to the lower left portion of the document Db, the background area Ab, in addition to a right-side portion of the document Db.

Figure 5B:
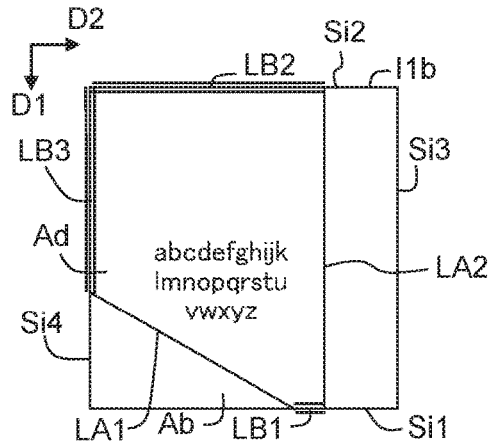

FIG. 5B depicts exemplary candidate lines identified in the read image I1b (FIG. 5A). In FIG. 5B, three end lines LB1 to LB3 and two inside lines LA1 and LA2 are identified. In FIG. 5B, the candidate line LB1 forms a part of a lower end (a side Si2) of the read image I1b, the candidate line LB2 forms a part of an upper end (a side Si2) of the read image I1b, and the candidate line LB3 forms a part of a left end (a side Si4) of the read image I1b. The candidate line LA1 represents a lower left crease of the document Db. The candidate line LA2 represents a right edge of the document Db.

Figure 5C:
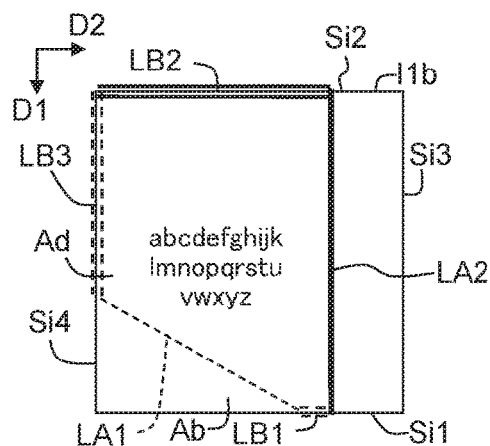

When the read image I1b is processed, the inside reference pair satisfying the parallel condition or the vertical condition is not detected in S313 of FIG. 4A (S316: No). In that case, in S323, the processor 110 searches a line pair formed from one inside line and one end line satisfying the parallel condition or the vertical condition, from among the candidate lines, and selects the line pair satisfying the parallel condition or the vertical condition, as reference lines for identifying the edge lines (referred also to as a mixed reference pair). For example, in FIG. 5B, a line pair LA2 and LB3 is detected as a candidate of the mixed reference pair satisfying the parallel condition. Further, two pairs (i.e., a line pair LB2 and LA2 and a line pair LA2 and LB1) are detected as candidates of the mixed reference pair satisfying the vertical condition. A method that is the same as the method described in S313 may be used as the method of selecting one pair when multiple pairs are detected as the candidates. The bold lines in FIG. 5C represent two exemplary candidate lines (i.e., one inside line and one end line) of the mixed reference pair which are finally selected from among the candidate lines in FIG. 5B. In the first embodiment, two candidate lines LA2 and LB2 longer than other candidate lines are selected as the mixed reference pair satisfying the vertical condition.

Figure 5D:
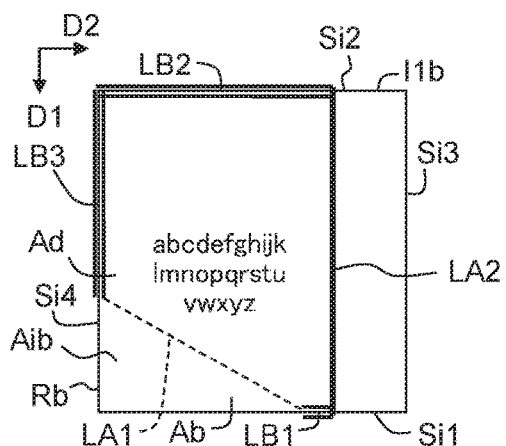

In S326 of FIG. 4A, the processor 110 determines whether one inside line and one end line (i.e., the mixed reference pair) satisfying the parallel condition or the vertical condition are detected in S323. When the mixed reference pair is detected (S326: Yes), the processor 110 proceeds to S350. The processing in S350, S370, and S380 is the same as the processing in S350, S370, and S380 performed when the determination result in S316 is Yes. The thick candidate lines LA2 and LB2 in FIG. 5C represent an exemplary first candidate line and an exemplary second candidate line that correspond to the mixed reference pair and are edge lines identified, in S350, from among the candidate lines in FIG. 5B. The thick candidate lines LB1 and LB3 in FIG. 5D represent an exemplary third candidate line and an exemplary fourth candidate line that are additional edge lines identified, in S370, based on the first and second candidate lines LA2 and LB2 in FIG. 5C. The candidate line LB1 satisfies the vertical condition with respect to the candidate line LA2. The candidate line LB3 satisfies the parallel condition with respect to the candidate line LA2. A rectangle Rb of FIG. 5D represents a rectangle formed from the four edge lines LB2, LA2, LB1, and LB3. An interior area Aib of the rectangle Rb represents the document area identified in S380. It can be considered that the processor 110 determines in S326 whether the mixed reference pair to be used as a reference of the edge lines can be selected.

Figure 5E:
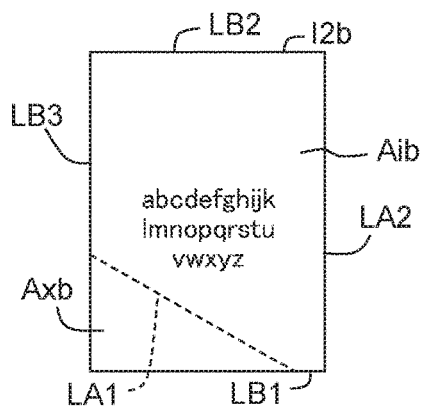

An image I2b of FIG. 5E is an output image generated in S150 (FIG. 2). The output image I2b represents a foreground area Ad (FIG. 5A) of which inclination is corrected based on the four thick edge lines LB2, LA2, LB1, and LB3 depicted in FIG. 5D. The output image I2b represents the interior document area Aib of the rectangle Rb in FIG. 5D. In FIG. 5E, a lower left area Axb of the output image I2b is an omission area that is not included in the foreground area Ad (FIG. 5A). The processor 110 corrects an image of the omission area Axb to a solid image having a color for blanks of the document. The omission area Axb corresponds to the background area Ab of the read image I1b. When the omission area does not correspond to the outside of the read image but corresponds to the background area of the read image, the image of the omission area may not be corrected. Namely, the image of the background may be used, as it is, as the image of the omission area of the output image.

Next, the processing performed when it is not determined in S326 of FIG. 4A (S326: No) that the mixed reference pair can be selected from among the candidate lines, is explained with reference to FIGS. 6A to 6E. A read image I1c of FIG. 6A is an exemplary image that is generated by reading a document Dc larger than the platen 440 (FIG. 1B). The read image I1c represents a part inside of the document Dc without representing its background area. Namely, the whole of the read image I1c represents the foreground area Ad. The document Dc is larger than the read image I1c.

FIG. 6B depicts exemplary candidate lines identified in the read image I1c (FIG. 6A). In FIG. 6B, four end lines LB1 to LB4 are identified as the candidate lines. In FIG. 6B, the candidate line LB1 forms a lower end (a side Si1) of the read image I1c; the candidate line LB2 forms an upper end (a side Si2) of the read image I1c; the candidate line LB3 forms a right end (a side Si3) of the read image I1c; and the candidate line LB4 forms a left end (a side Si4) of the read image I1c.

When the read image I1c is processed, the inside reference pair satisfying the parallel condition or the vertical condition is not detected in S316 of FIG. 4A (S316: No). The mixed reference pair satisfying the parallel condition or the vertical condition is not detected in S326 (S326: No). In that case, the processor 110 searches, in S333, a line pair formed from two end lines satisfying the parallel condition or the vertical condition from among the candidate lines, and selects the line pair satisfying the parallel condition or the vertical condition, as reference lines for identifying the edge lines (also referred to as an end reference pair). For example, in FIG. 6B, two pairs (i.e., a line pair LB1 and LB2 and a line pair LB3 and LB4) are detected as candidates of the end reference pair satisfying the parallel condition. Further, four pairs (i.e., a line pair LB2 and LB3, a line pair LB3 and LB1, a line pair LB1 and LB4, and a line pair LB4 and LB2) are detected as candidates of the end reference pair satisfying the vertical direction. A method that is the same as the method described in S313 may be used as the method of selecting one pair when multiple pairs are detected as the candidates. The bold lines in FIG. 6C represent two exemplary candidate lines (i.e., two end lines) which are finally selected from among the candidate lines in FIG. 6B. In the first embodiment, two candidate lines LA3 and LB4 longer than other candidate lines are selected as the end reference pair satisfying the parallel condition.

In S336 of FIG. 4B, the processor 110 determines whether two candidate lines (i.e., the end reference pair) satisfying the parallel condition or the vertical condition are detected in S333. When the end reference pair is detected (S336: Yes), the processor 110 proceeds to S350. The processing of S350, S370, and S380 is as described above. The thick candidate lines LB3 and LB4 in FIG. 6C represent exemplary first and second candidate lines that correspond to the end reference pair and are the edge lines identified, in S350, from among the candidate lines in FIG. 6B. The thick candidate lines LB1 and LB2 in FIG. 6D represent exemplary third and fourth candidate lines that are additional edge lines identified, in S370, based on the first and second candidate lines LB3 and LB4 in FIG. 6C. The candidate line LB1 satisfies the vertical condition with respect to the candidate line LB3. The candidate line LB2 satisfies the vertical condition with respect to the candidate line LB3. A rectangle Rc of FIG. 6D represents a rectangle formed from the four edge lines LB1 to LB4. An interior area Aic of the rectangle Rc represents the document area identified in S380. It can be said that the processor 110 determines in S336 whether the end reference pair to be used as a reference of the edge lines can be selected.

An image I2c of FIG. 6E is an output image generated in S150 (see FIG. 2). The output image I2c represents a foreground area Ad (FIG. 6A) of which inclination is corrected based on the four thick edge lines LB1 to LB4 depicted in FIG. 6D. The output image I2c represents an interior document area Aic of the rectangle Rc in FIG. 6D. In FIG. 6D, the four edge lines LB1 to LB4 are not inclined to the read image I1c, and the document area Aic corresponds to the whole of the read image I1c. Thus, the output image I2c is the same as the read image I1c.

Figure 7A:
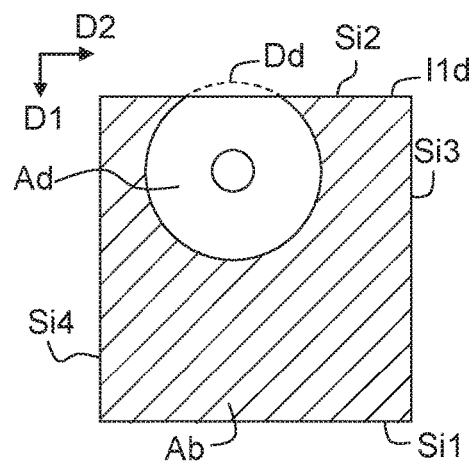
FIGS. 7A to 7C are illustrative views of a fourth example of the read image.

Next, the processing performed when it is not determined in S336 of FIG. 4B (S336: No) that the end reference pair can be selected from among the candidate lines, is explained with reference to FIGS. 7A to 7C. A read image I1d of FIG. 7A is an exemplary image that is generated by reading a non-rectangular document Dd (here, a circular document), such as a compact disc. The read image I1d includes a foreground area Ad representing the document Dd and a background area Ab. In FIG. 7A, a part of the document Dd extends beyond the read image I1d.

Figure 7B:
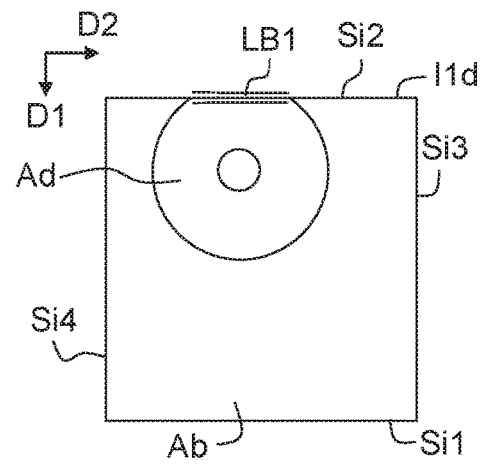

FIG. 7B depicts exemplary candidate lines identified in the read image I1d (FIG. 7A). In FIG. 7B, one candidate line LB1 is identified. The candidate line LB1 is an end line representing a part, of an end of the read image I1d, overlapping with the document Dd. No inside line is identified.

When the read image I1d is processed, the inside reference pair satisfying the parallel condition or the vertical condition is not detected in S316 of FIG. 4A (S316: No). The mixed reference pair satisfying the parallel condition or the vertical condition is not detected in S326 (S326: No). The end reference pair satisfying the parallel condition or the vertical condition is not detected in S336 (S336: No). In that case, the processor 110 determines in S390 that the edge lines representing the edges of the document and the document area representing the document are not identified, and the processor 110 ends the processing of FIGS. 4A and 4B.

Figure 7C:
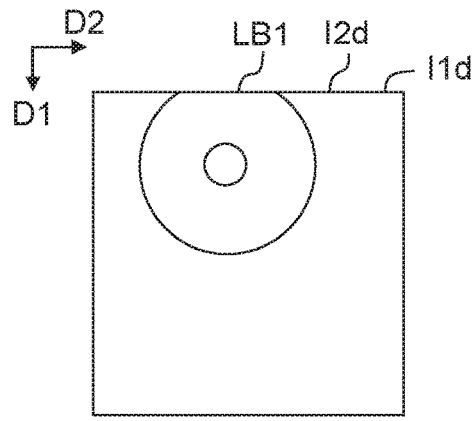

When no edge lines are identified, the processor 110 uses, in S150 of FIG. 2, the read image as it is, as an output image. FIG. 7C depicts an output image I2d generated by using the read image I1d of FIG. 7A. The output image I2d is the same as the read image I1d.

As described above, in the first embodiment, the processor 110 determines in S313 and S316 in FIG. 4A whether the inside reference pair can be selected. When the processor 110 has determined that the inside reference pair can be selected (S316: Yes), the processor 110 identifies, in S350 and S370, the edge lines by using the inside reference pair.

When the processor 110 has not determined that the inside reference pair can be selected (S316: No), the processor 110 determines in S323 and S326 whether the mixed reference pair can be selected. When the processor 110 has determined that the mixed reference pair can be selected (S326: Yes), the processor 110 identifies, in S350 and S370, the edge lines by using the mixed reference pair.

When the processor 110 has not determined that the mixed reference pair can be selected (S326: No), the processor 110 determines in S333 and S336 whether the end reference pair can be selected. When the processor 110 has determined that the end reference pair can be selected (S336: Yes), the processor 110 identifies, in S350 and S370, the edge lines by using the end reference pair.

As described above, the processor 110 determines whether reference lines (here, the reference pair formed from two candidate lines) can be selected in order of the inside reference pair, the mixed reference pair, and the end reference pair. Here, a percentage of the total number of the end lines to the total number of the candidate lines included in the reference pair is referred to as a percentage of end lines, and a percentage of the total number of the inside lines to the total number of the candidate lines included in the reference pair is referred to as a percentage of inside lines. The percentage of end lines is 0% for the inside reference pair, is 50% for the mixed reference pair, and is 100% for the end reference pair. The percentage of inside lines is 100% for the inside reference pair, is 50% for the mixed reference pair, and is 0% for the end reference pair. The percentage of end lines for the reference pair used earlier is lower than the percentage of end lines for the reference pair used later. The percentage of inside lines for the reference pair used earlier is higher than the percentage of inside lines for the reference pair used later. Thus, the inside lines are used preferentially over the end lines as the reference lines for identifying the edge lines. This enables the edge lines to be appropriately identified when a part of the document extends over an end of the read image, like the exemplary image depicted in FIG. 3A.

The processor 110 searches, in S313 of FIG. 4A, the inside reference pair that is a line group consisting of the inside lines (namely, including no end line), when the candidate lines include the inside lines and the end lines. When the processor 110 has determined that the inside reference pair can be selected (S316: Yes), the processor 110 identifies, in S350 and S370, the edge lines by using the inside reference pair. Thus, a part, of an end of the read image, overlapping with the document is prevented from being erroneously identified as the edge line, and the edge lines representing the edges of the document can be appropriately identified from among the candidate lines, when a part of the document extends beyond an end of the read image, like the exemplary image depicted in FIG. 3A.

In S323 of FIG. 4A, the processor 110 searches the mixed reference pair that is a line group including both the end line and the inside line, when the candidate lines include the inside lines and the end lines. When the processor 110 has determined that the mixed reference pair can be selected (S326: Yes), the processor 110 identifies, in S350 and S370, the edge lines by using the mixed reference pair. Thus, it is possible to appropriately identify the edge lines by using both the inside line and the end line, for example, when the inside line LA1 in FIG. 5A that represents a boundary different from the edge of the document (e.g., the crease of the document Db) is identified. Besides the crease made by folding the document, when the read image represents a boundary different from the actual edges of the document, such as a break made by cutting a part of the document, the edge lines can be appropriately identified.

As described in S316, S326, and S336 of FIGS. 4A and 4B, the processor 110 identifies the edge lines by using the end reference pair (S350), when the processor 110 has not determined that the inside reference pair can be selected (S316: No), when the processor 110 has not determined that the mixed reference pair can be selected (S326: No), and when the processor 110 has determined that the end reference pair consisting of the end lines can be selected (S336: Yes). Thus, the processor 110 appropriately identifies the edge lines by using the end reference pair when the processor 110 has not determined that the mixed reference pair can be selected.

As described in S313 and S316 of FIG. 4A, when two candidate lines including one or more inside lines, which are the first and second candidate lines in the predefined parallel state or the predefined vertical state, can be selected from among the candidate lines, the processor 110 determines that the reference pair (the inside reference pair) formed from the first and second candidate lines can be selected. The processor 110 appropriately identifies the edge lines by using the first and second candidate lines.

As described in S323 and S326 of FIG. 4A, when two candidate lines that are formed from one inside line and one end line and satisfy the parallel condition or the vertical condition can be selected from among the candidate lines, the processor 110 determines that the reference pair (the mixed reference pair) formed from the two candidate lines can be selected. As described in S333 and 336 of FIG. 4B, when two candidate lines that include one or more of end lines and satisfy the parallel condition or the vertical condition can be selected from among the candidate lines, the processor 110 determines that the reference pair (the end reference pair) formed from the two candidate lines can be selected. In all the cases, the processor 110 appropriately identifies the edge lines by using the two candidate lines satisfying the parallel condition or the vertical condition.

As described in S350 of FIG. 4B, the processor 110 identifies two candidate lines forming a reference pair (i.e., two candidate lines in the parallel state or the vertical state), as the candidate lines representing the edges of the document. Then, as described in S370, the processor 110 identifies other two candidate lines that form a rectangle by combining them with the two candidate lines identified. Then, as described in S380, the processor 110 identifies the interior area of the rectangle formed from the four candidate lines identified, of the read image, as the document area representing the document. This allows the processor 110 to appropriately identify the rectangular area representing the document.

Second Embodiment

A second embodiment of the processing of identifying the edge lines and the document area (FIG. 2: S140) is explained with reference to FIG. 8. The flowchart in FIG. 8 indicates a part of the processing. In the second embodiment, the processing is switched depending on the reading mode.

In the second embodiment, the processing of S210 to S240 in FIG. 4A is executed similarly to the first embodiment. Then, the processing proceeds from S240 to S400 in FIG. 8. In S400, the processor 110 determines whether the reading mode of the scanner 400 used for generating the read image data is the conveyance mode using the conveyance unit 450. When the reading mode is the conveyance mode (S400: Yes), the processor 110 executes S313 of FIG. 4A. The processing subsequent to S313 is the same as that in the first embodiment.

When the reading mode is not the conveyance mode but the platen mode (S400: No), the processor 110 determines in S410 whether the candidate lines identified in S230 (FIG. 4A) include one or more end lines. When the reading mode is the platen mode, the user puts the document on the platen 440 so as not to cause the document to extend beyond the platen 440 (FIG. 1B). Thus, when the candidate lines include the end line(s), the end line(s) is/are considered to represent the edge(s) of the document rather than part(s), of the document, extending beyond the read image (e.g., the end lines LB1 and LB2 in FIG. 3B). In the second embodiment, when the candidate lines include one or more of end lines, the edge line(s) is/are identified by preferentially using the end line(s). First, the processing performed when the candidate lines include one or more of end lines (S410: Yes) is explained with reference to FIGS. 9A to 9E.

A read image I1e in FIG. 9A is an exemplary image that is generated by reading a rectangular document De that is partially folded. The read image I1e represents a foreground area Ad representing the document De and a background area Ab. In FIG. 9A, the document De is not inclined to the read image I1e. An upper left angle Dec of the document De overlaps with an upper left corner I1ec of the read image I1e (i.e., the upper left corner Dec of the document De is placed on a corner of the platen 440 (FIG. 1B) during reading of the document De). An upper edge of the document De overlaps with an upper side Si2 of the read image I1e, and a left edge of the document De overlaps with a left side Si4 of the read image I1e. In the read image I1e, the length of the document De in the first direction D1 is shorter than the length of the read image I1e in the first direction D1. The document De is read by the scanner 400 in a state where the lower left corner of the rectangular document De is folded.

FIG. 9B depicts exemplary candidate lines identified in the read image I1e (FIG. 9A). In FIG. 9B, two end lines LB1 and LB2 and three inside lines LA1 to LA3 are identified. In FIG. 9B, the candidate line LB1 forms a part of a left end (the side Si4) of the read image I1e, and the candidate line LB2 forms a part of an upper end (the side Si2) of the read image I1e. The candidate line LA1 represents a lower left crease of the document De. The candidate line LA2 represents a right edge of the document De. The candidate line LA3 represents a part, of a lower edge of the document De, which is not folded.

Figure 8:
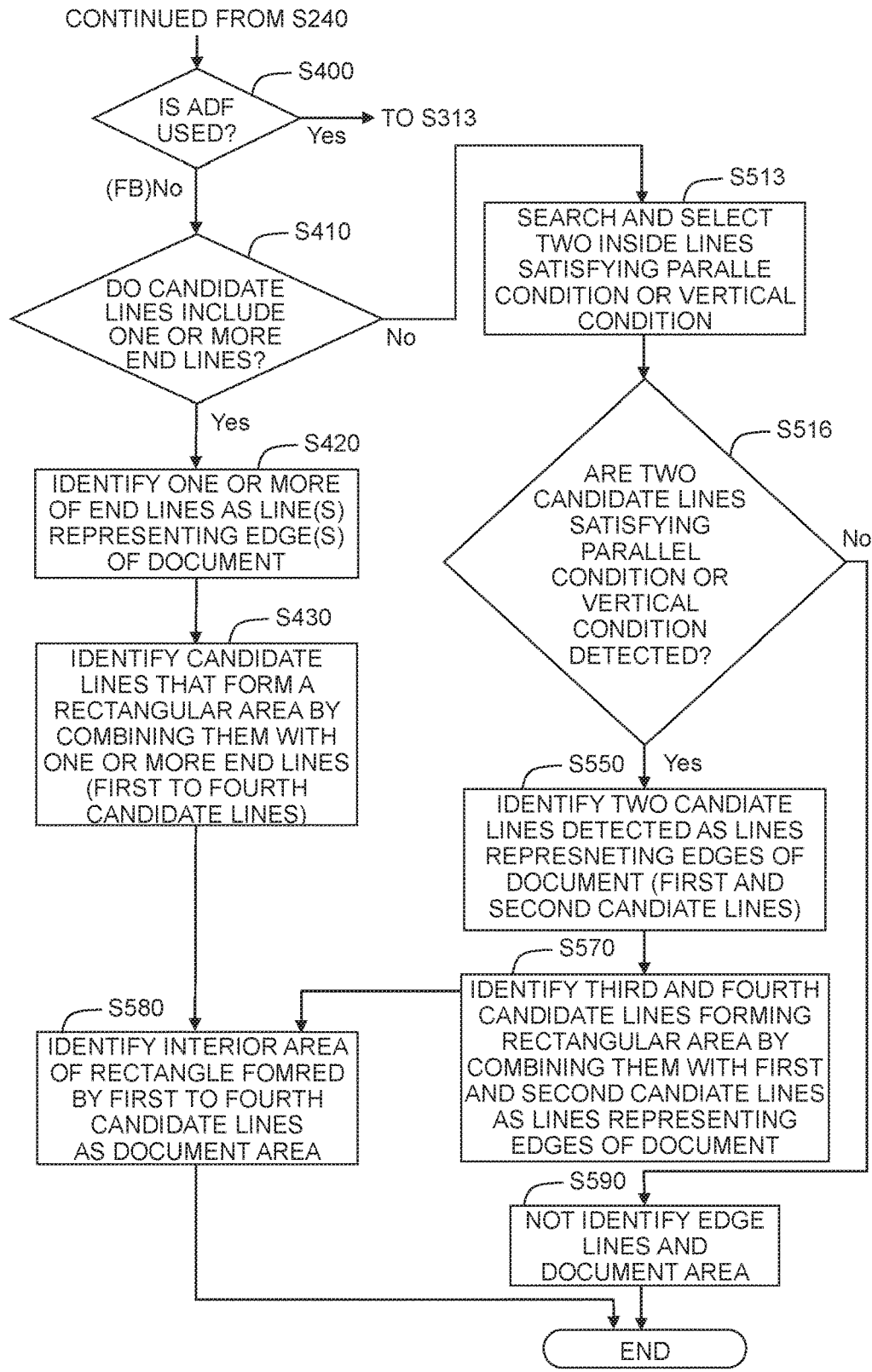
FIG. 8 is a flowchart indicating the processing of identifying edge lines and a document area according to a second embodiment.

When the read image I1e is processed, the processor 110 determines in S410 of FIG. 8 that the candidate lines include one or more of end lines. In that case, the processor 110 identifies, in S420, all the end lines included in the candidate lines, as the edge lines. The bold lines in FIG. 9C represent exemplary lines that are identified, in S420, as the edge lines from among the candidate lines in FIG. 9B. In the second embodiment, the two end lines LB1 and LB2 are identified as the edge lines.

In S430 of FIG. 8, the processor 110 identifies, as additional edge lines, candidate lines that form a rectangle by combining them with the edge lines identified in S420. The processing in S430 is executed similarly to the processing in S370 of FIG. 4B. That is, the additional edge lines corresponding to remaining sides of the rectangle are identified based on the positional relation with one or more of edge lines identified in S420 (i.e., the vertical condition or the parallel condition). The bold lines in FIG. 9D represent exemplary additional edge lines identified based on the edge lines LB1 and LB2 in FIG. 9C. In this example, the candidate lines LA2 and LA3 are identified as the additional edge lines fanning the rectangle. The candidate line LA2 satisfies the parallel condition with respect to the candidate line LB1. The candidate line LA3 satisfies the vertical condition with respect to the candidate line LB1. The total number of additional edge lines identified in S430 is the same as a difference obtained by subtracting the total number of edge lines identified in S420 from four that is the total number of sides of the rectangle. For example, when the total number of edge lines identified in S420 is 1, three additional edge lines may be identified in S430.

The processing of S580 is the same as the processing of S380 in FIG. 4B. The processor 110 identifies an interior area of the rectangle formed from the four edge lines as the document area representing the document. In FIG. 9D, an interior area Aie of the rectangle Re made by extending the four edge lines LA2, LA3, LB1, and LB2 is identified as the document area. After identifying the four edge lines and the document area, the processor 110 ends the processing in FIG. 8 (i.e., the processing of S140 in FIG. 2).

In S150 of FIG. 2, the processor 110 generates output image data by use of the four edge lines identified in S420 and S430 and the document area identified in S580. An image I2e of FIG. 9E is an exemplary output image generated from the read image I1e in FIG. 9A. The output image I2e represents the interior document area Aie of the rectangle Re in FIG. 9D. In FIG. 9E, a lower left area Axx of the output image I2e is an omission area that is not included in the foreground area Ad (FIG. 9A). The processor 110 corrects an image of the omission area Axx to a solid image having a color for blanks of the document.

Figure 10A:
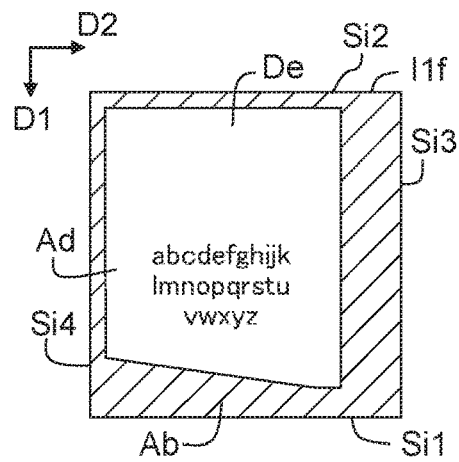
FIGS. 10A to 10E are illustrative views of a sixth example of the read image.

Next, the processing performed when the candidate lines include no end line (S410: No) is explained with reference to FIGS. 10A to 10E. A read image I1f in FIG. 10A is an exemplary read image obtained when the document De is read by the scanner 400 in a state where the whole of the document De is placed inside the edges of the platen 440. The read image I1f represents a foreground area Ad representing the document De and a background Ab. In this case, the document De is read in a state where a lower left corner of the document De is folded, similarly to the document De in FIG. 9C. The foreground area Ad is surrounded by the background area Ab.

Figure 10B:
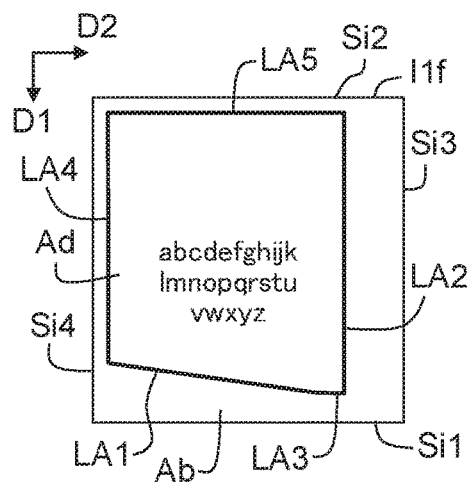

FIG. 10B depicts exemplary candidate lines identified in the read image I1f. In FIG. 10B, five inside lines LA1 to LA5 are identified. In FIG. 10B, the candidate line LA1 represents a lower left crease of the document De; the candidate line LA2 represents a right edge of the document De; the candidate line LA3 represents a part, of a lower edge of the document De, which is not folded; and the candidate line LA4 represents a left edge of the document De; and the candidate line LA5 represents an upper edge of the document De.

Figure 10C:
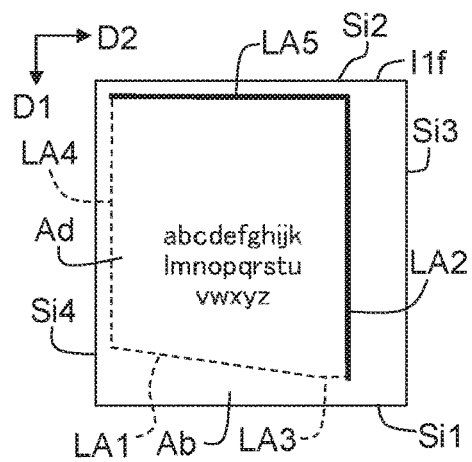

When the read image I1f is processed, the processor 110 determines in S410 of FIG. 8 that the candidate lines do not include one or more of end lines (S410: No). In that case, the processor 110 executes the processing of S513 and S516. The processing of S513 and S516 is the same as the processing of S313 and S316 in FIG. 4A. In S513, the processor 110 searches two inside lines satisfying the parallel condition or the vertical condition from among the candidate lines, and selects the two inside lines satisfying the parallel condition or the vertical condition, as the inside reference pair. The bold lines in FIG. 10C represent two exemplary candidate lines (i.e., two inside lines) of the inside reference pair which are finally selected from among the candidate lines in FIG. 10B. In this example, two candidate lines LA2 and LA5 which are longer than other candidate lines are selected as the inside reference pair satisfying the vertical condition.

Figure 10D:
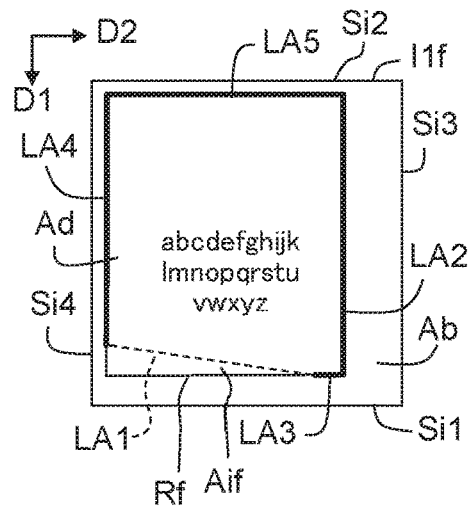

In S516 of FIG. 8, the processor 110 determines whether two inside lines satisfying the parallel condition or the vertical condition (i.e., the inside reference pair) are detected in S513. When the inside reference pair is detected (S516: Yes), the processor 110 executes the processing of S550 and S570, and then executes the processing S580. The processing of S550 and S570 is the same as the processing of S350 and S370 of FIG. 4B. In S550, the processor 110 identifies the two candidate lines forming the inside reference pair detected in S513, as the edge lines representing the edges of the document. In FIG. 10C, the candidate lines LA2 and LA5 are identified as the edge lines. In S570, the processor 110 identifies, as the lines representing the edges of the document, two additional candidate lines that form a rectangle by combining them with the two edge lines identified. The bold lines in FIG. 10D represent two exemplary additional candidate lines identified based on the two edge lines LA2 and LA5 depicted in FIG. 10C. In this example, the candidate lines LA3 and LA4 are identified as the two additional candidate lines forming the rectangle. In S580, the processor 110 identifies an interior area of the rectangle formed from the four edge lines, as the document area representing the document. In FIG. 10D, an interior area Aif of the rectangle Rf made by extending the four edge lines LA2 to LA5 is identified as the document area. After identifying the four edge lines and the document area, the processor 110 ends the processing in FIG. 8 (i.e., S140 of FIG. 2).

Figure 10E:
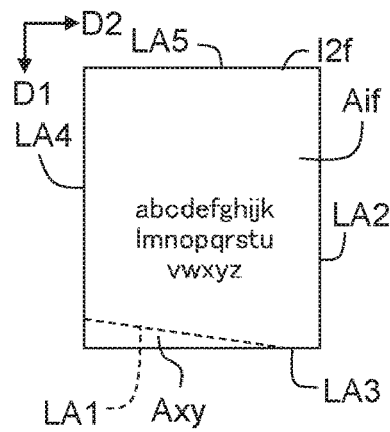

In S150 of FIG. 2, the processor 110 generates output image data by using the four edge lines identified in S550 and S570 of FIG. 8 and the document area identified in S580. An image I2f of FIG. 10E is an exemplary output image generated from the read image I1f of FIG. 10A. The output image I2f represents the interior area Aif of the rectangle Rf in FIG. 10D. In FIG. 10E, a lower left area Axy of the output image I2f is an omission area that is not included in the foreground area Ad (see FIG. 10A). The processor 110 corrects an image of the omission area Axy to a solid image having a color for blanks of the document.

When the determination result in S516 of FIG. 8 is No (i.e., when two candidate lines satisfying the parallel condition or the vertical condition are not detected), the processor 110 determines in S590 that neither the edge lines representing the edges of the document nor the document area representing the document are identified, and ends the processing of FIG. 8.

In the conveyance mode, the document is conveyed during reading of the document. This easily causes a position deviation of the document relative to the reader 420. When the document has deviated from the reader 420, the end lines may not represent the edges of the document, but may represent parts, of the document, extending beyond the read image (e.g., the edge lines LB1 and LB2 in FIG. 3B).

In the second embodiment, when the reading mode is the conveyance mode (S400 of FIG. 8: Yes), the processor 110 identifies the edge lines and the document area by preferentially using the inside lines, similarly to the first embodiment. This enables the edge lines and the document area to be appropriately identified.

In the platen mode, the document is not moved during reading of the document. This hardly causes the position deviation of the document relative to the reader 420. Thus, it can be assumed that the end lines represent the edges of the document. In the second embodiment, when the reading mode is the platen mode (S400 of FIG. 8: No), the processor 110 determines whether the candidate lines include one or more of end lines (S410). When the candidate lines include one or more of end lines (S410: Yes), the processor 110 identifies (S420) the edge lines by using a line group including the one or more of end lines. When the candidate lines do not include one or more of end lines (S410: No), the processor 110 may identify (S550) the edge lines by using a line group consisting of the inside lines. Since the end lines are preferentially used to identify the edge lines and the document area, the edge lines and the document area can be identified appropriately.

Modified Embodiments

The processing of identifying the candidate lines in the read image (S230: FIG. 4A) may be any other processing of identifying lines that may represent the edges of the document than the processing using the Hough transform described in FIG. 3C. For example, the processor 110 may identify candidate lines that approximate placement of contour pixels by using a least-square technique.

One or more of reference lines which may be selected to identify the edge lines (hereinafter, referred also to as a reference line group or a reference line set) may be a variety of candidate lines without limited to the three kinds of line pairs (i.e., the inside reference pair, the mixed reference pair, and the end reference pair). For example, it may be possible to use only two kinds of line pairs that are randomly selected from the inside reference pair, the mixed reference pair, and the end reference pair.

The condition used for determining whether the reference line set can be selected from among the candidate lines (e.g., the condition for the processing of S316, S326, and S336) may be any other condition than the condition in which two candidate lines satisfying the vertical condition or the parallel condition are detected. For example, any one of the condition in which two candidate lines satisfying the vertical condition are detected and the condition in which two candidate lines satisfying the parallel condition are detected may be adopted.

The total number of the candidate lines included in the reference line set that is selected to identify the edge lines is not limited to two, and it may be one or more than three. The reference pair in each embodiment represents two candidate lines corresponding to two sides of the four sides forming the rectangle. Instead of that, three candidate lines corresponding to three sides of the four sides forming the rectangle may be selected as the reference line set. The three reference lines can be identified by using, for example, the vertical condition and the parallel condition. Specifically, three candidate lines including two candidate lines which satisfy the parallel condition and one candidate line which satisfies the vertical condition with respect to one of the two candidate lines may be identified. When the three reference lines are selected, it is possible to adopt various kinds of reference line sets (i.e., various combinations of the three reference lines). For example, it is possible to use more than two combinations which are randomly selected from the following four combinations: three inside lines; two inside lines and one end line; one inside line and two end lines; and three end lines.

In all the cases, the candidate lines that can form the sides of the rectangle are highly likely to represent the edges of the rectangular document. Thus, two or more of candidate lines satisfying the condition in which the two or more of candidate lines respectively correspond to two or more of sides of the four sides forming the rectangle, can be used as the reference lines for identifying the edge lines. Such reference lines can be adopted as the edge lines.

The condition used for determining whether the reference line set can be selected from among the candidate lines may be a condition different from the parallel condition or the vertical condition. For example, it is allowable to adopt a condition in which candidate lines, of which lengths in the read image are longer than a predefined reference length and the total number of which is not less than a predefined reference number (e.g., one, two, three, or four lines), are detected. The long candidate line is more likely to represent an edge of the document than the short candidate line. Thus, the long candidate line is usable as the reference line for identifying the edge line. Such a reference line can be adopted as the edge line. As a reference length, a value greater than a threshold value of a length for identifying the candidate lines (e.g., the threshold value of the number of contour pixels) is used. As the predefined reference number of candidate lines (i.e., the reference line set), reference line sets having mutually different total numbers of the inside lines (i.e., reference line sets having mutually different total numbers of the end lines) can be used. For example, when the reference number is one, two lines including one inside line and one end line can be used. When the reference number is two, three line pairs can be used similarly to the example depicted in FIGS. 4A and 4B. In both cases, a longer inside line forming the reference line set is preferentially selected, and a longer end line forming the reference line set is preferentially selected.

The processor 110 may select, as the reference line, a candidate line satisfying a predefined condition from among the candidate lines. Such a condition is not limited to the condition in which two candidate lines are in the parallel state or the vertical state, or the condition in which the length of each candidate line in the read image is longer than the predefined reference length, and a variety of conditions in which a target candidate line is more likely to represent an edge of the document than any other candidate lines, may be adopted. The reference lines selected under any of the above conditions allow document information including at least one of lines representing at least a part of the edges of the document and an inclination of the document to be identified appropriately. The reference lines may be identified as the edge lines.

In both cases, which one of the reference line sets is selected is preferably determined by preferentially selecting the inside lines, for example, in the following order: an order starting from one having a higher percentage of the inside lines; an order starting from one having a lower percentage of the end lines; an order starting from one having a larger total number of the inside lines; an order starting from one having a smaller total number of the end lines; or the like. Thus, it is possible to appropriately identify the edge lines when a part of the document extends beyond the read image, like the read image Ia1 in FIG. 3A.

The reference line sets may have mutually different conditions used for determining whether the reference line set can be selected. For example, the condition for the inside reference pair and the condition for the end reference pair may be a condition in which two candidate lines in the parallel state or the vertical state (i.e., the inside reference pair or the end reference pair) can be selected. The condition for the mixed reference pair may be a condition in which two candidate lines in the parallel state rather than the vertical state (i.e., the mixed reference pair) can be selected. Typically, when Q kinds of reference line set (Q is an integer not less than two) are usable, the condition for determining whether the Rth reference line set ($1 \leq R \leq Q$) can be selected may be a condition in which candidate lines satisfying the Rth condition (i.e., Rth reference line set) can be selected. Here, all the Q pieces of condition may be the same or may be different from each other. Or, S pieces ($2 \leq S \leq Q-1$) of condition, which are some of Q pieces of condition, may be the same, and remaining Q-S pieces of condition may be different from each other.

The processing of identifying additional edge lines forming a rectangle, from among the candidate lines, by use of three or less edge lines (FIG. 4B: S370) may be any other processing than the processing using the vertical condition or the parallel condition. For example, the following processing may be adopted. Of predefined regular sizes (e.g., A4 size, letter size, and B5 size), a regular size that is closest in size and shape to a foreground area (referred to as a target size) is identified. For example, a regular size having a minimum total area of parts which do not overlap with each other when the regular size is overlapped with the foreground area, is selected as the target size. Edges of the target size identified are overlapped with the edge lines identified. Of the edges of the target size overlapped with the edge lines, a candidate line in the vicinity of an edge of the target size which is mapped to no edge line, is identified as an additional edge line. The condition for determining whether the candidate line is in the vicinity of the edge may be any condition in which the candidate line extends along the edge (referred to as a vicinity condition). The vicinity condition may be a condition, for example, in which the edge and the candidate line satisfy the parallel condition and a shortest distance between the edge and the candidate line on the read image is not more than a predefined distance threshold value. The distance threshold value is not less than zero, and set to a value sufficiently smaller than a length of short sides of the target size (e.g., a value not more than ⅒ of the length of the short sides).

As described above, the condition for identifying the additional candidate lines forming the rectangle (referred to as a rectangle condition) may be any condition in which the candidate lines are combined with the edge lines identified to form the rectangle. The candidate lines satisfying the rectangle condition may be identified as the additional candidate lines. The rectangle for identifying the additional candidate lines (i.e., the rectangle formed by using the candidate lines) may be a strict rectangle or a rectangle of which shape is changed from the strict rectangle within a permissible range. The permissible range of the deformation is a range permitted based on the rectangle condition such as the vertical condition, the parallel condition, and/or the vicinity condition.

As described in S313 of FIG. 4A, the vertical condition may include a substantially vertical state, and the parallel condition may include a substantially parallel state. Further, as described above, the shape of the rectangle document area identified by use of the edge lines (e.g., the document area identified in S380 of FIG. 4B) is not limited to the strict rectangle, but may be a substantial rectangle. Here, the processor 110 may generate output image data representing an output image including the whole of the document area. For example, the output image may be a minimum rectangular image including the whole of the document area. Further, the processor 110 may generate output image data representing an output image including only a part of the document area. For example, the output image may be a maximum rectangular image included in the document area.

Instead of the processing described in FIGS. 2, 4A, 4B, and 8, the image processing using read image data may be any processing of identifying the document information including at least one of the edge lines and an inclination of the document through the analysis of the read image represented by the read image data. For example, the processing of S370 and S380 in FIG. 4B may be omitted. Further, the processing of S570 and S580 in FIG. 8 may be omitted. In such cases, for example, the processor 110 may identify the inclination of the document in the read image by use of the edge lines identified in S350 or S550 and may use, as the output image, the image obtained by correcting the inclination relative to the read image. In that case, the output image may include the background area in addition to the foreground area.

The processor 110 may function as an output unit that outputs at least one of information indicating the edge lines in the read image and information indicating the inclination of the document relative to the read image, without generating the output image data. As an output destination, for example, at least one of the storage (e.g., the non-volatile storage 130, FIG. 1) and the display (e.g., the display 140) may be adopted. When the output destination is the storage, the processor 110 may store, in the storage, for example, data including at least one of information indicating the edge lines in the read image and information indicating the inclination of the document relative to the read image. When the output destination is the display, for example, the processor 110 may display the read image on the display 140 and display the edge lines on the read image such that the edge lines overlap with the read image. A user can easily confirm the inclination of the document, the edges of the document, and the document area by observing the edge lines displayed.

The apparatus optically reading the document may be any other apparatus that can optically read the document than the scanner 400 described in FIGS. 1A and 1B. For example, the conveyance unit 450 may be omitted from the scanner 400. Or, the platen 440 may be omitted from the scanner 400. Image data generated by taking a picture of the document by use of a digital camera may be used as the read image data. In all the cases, the processor 110 of the image processing apparatus 100 may acquire the read image data from a reader (e.g., the scanner 400 or the digital camera) connected to the image processing apparatus 100 via the network NT or an unillustrated cable (e.g., a. USB cable). The processor 110 may acquire the read image data from an external storage apparatus (not depicted in the drawings, for example, a USB memory) connected to the image processing apparatus 100.

The image processing apparatus of FIG. 1 may be an apparatus different from the personal computer. For example, the image processing apparatus may be incorporated into the reader optically reading the document, such as the scanner (e.g., the scanner 400) or the digital camera. The image processing apparatus may be a server connected to the network. Apparatuses (e.g., computers) communicating with each other via the network may provide the entire function of the image processing by making the respective apparatuses execute part of the image processing. Namely, a system including those apparatuses corresponds to the image processing apparatus.

In each of the embodiments, the configuration achieved by hardware may be partially replaced with software. Instead, the configuration achieved by software may be partially or entirely replaced with hardware. For example, the function achieved by S140 of FIG. 2 may be achieved by a dedicated hardware circuit.

When a part or all of the functions of the present teaching is/are achieved by a computer program, the program may be provided in a state of being stored in a computer-readable storage medium (e.g., a non-transitory storage medium). The program may be used in a state of being stored in a storage medium (a computer-readable storage medium) which is the same as or different from the storage medium when being provided. The computer readable storage medium is not limited to portable storage mediums such as a memory card and CD-ROM, but also may include any internal storage of the computer such as a ROM, and any external storage apparatus connected to the computer such as a hard disk drive.

As above, the present teaching has been explained with the embodiments and modified embodiments. The embodiments described above are provided to facilitate understanding of the present teaching, and the present teaching is not limited to those. The present teaching may be changed or modified without departing from the gist and the scope of the claims below, and includes equivalents thereof.

What is claimed is:

1. A non-transitory computer-readable medium storing a program executable by a processor of an image processing apparatus that, when executed by the processor of the image processing apparatus, causes the image processing apparatus to execute:

read image data acquisition processing of acquiring read image data which is generated by optically reading a document and represents a read image including the document;

line identification processing of identifying candidate lines which are candidates of lines representing edges of the document through analysis of the read image; and document information identification processing of identifying document information including at least one of a candidate line which represents at least a part of the edges of the document in the read image and an inclination of the document relative to the read image, by using a reference line formed from at least one of the candidate lines identified, wherein the document information identification processing includes:

first determination processing of determining whether a first-kind reference line group including at least one inside line is selectable from among the candidate lines, the at least one inside line being a candidate line running inside ends of the read image;

first identification processing of identifying the document information by using the first-kind reference line group, in a case that it is determined that the first-kind reference line group is selectable; and second identification processing of identifying the document information by using a second-kind reference line group which includes at least one end line of the candidate lines, in a case that it is determined that the first-kind reference line group is not selectable, the at least one end line being a candidate line which forms one of the ends of the read image, a ratio of a total number of the at least one end line to a total number of the candidate lines included in the second-kind reference line group being higher than a ratio of the total number of the at least one end line to a total number of the candidate lines included in the first-kind reference line group.

2. The medium according to claim 1, wherein, in a case that the candidate lines include the at least one inside line and the at least one end line, a line group which includes no end line but includes the at least one inside line is used as the first-kind reference line group in the first determination processing.

3. The medium according to claim 1, wherein, in a case that the candidate lines include the at least one inside line and the at least one end line, a line group including the at least one end line and the at least one inside line is used as the second-kind reference line group in the second identification processing.

4. The medium according to claim 1,
wherein the document information identification processing includes:
second determination processing of determining whether the second-kind reference line group is selectable from among the candidate lines; and
third identification processing of identifying the document information by using a third-kind reference line group which only includes the at least one end line of the candidate lines, in a case that it is determined that the second-kind reference line group is not selectable, and
wherein in a case that it is determined that the second-kind reference line group is selectable, the document information is identified by using the second-kind reference line group in the second identification processing.

5. The medium according to claim 1,
wherein the document information identification processing includes:
first document information identification processing of identifying the document information, in a case that the read image data is generated by optically reading the document while moving the document relative to an optical element without moving the optical element; and
second document information identification processing of identifying the document information, in a case that the read image data is generated by optically reading the document while moving the optical element relative to the document without moving the document,
the second document information identification processing includes:
determining whether the candidate lines include the at least one end line;
in a case that the candidate lines include the at least one end line, identifying the document information by using a line group which includes the at least one end line; and
in a case that the candidate lines include no end lines, identifying the document information by using a line group which only includes the at least one inside line.

6. The medium according to claim 1, wherein, in the first determination processing, in a case that two candidate lines including the at least one inside line are selectable from among the candidate lines and the two candidate lines are a first candidate line and a second candidate line in a predefined parallel state or a predefined vertical state, it is determined that the first-kind reference line group including the first candidate line and the second candidate line is selectable.

7. The medium according to claim 6,
wherein, in the first identification processing, the first candidate line and the second candidate line are identified as candidate lines which represent at least a part of the edges of the document in the read image, and
the program causes the image processing apparatus to further execute:
processing of identifying, from among the candidate lines, a third candidate line and a fourth candidate line which are combined with the first candidate line and the second candidate line to form a rectangle, and
processing of identifying an interior area of the rectangle formed from the first candidate line, the second candidate line, the third candidate line, and the fourth candidate line in the read image, as an area representing the document.

8. An image processing apparatus comprising a processor, wherein the processor is configured to execute:
acquisition processing of acquiring read image data which is generated by optically reading a document and represents a read image including the document;
line identification processing of identifying candidate lines which are candidates of lines representing edges of the document through analysis of the read image; and
document information identification processing of identifying document information including at least one of a candidate line which represents at least a part of the edges of the document in the read image and an inclination of the document relative to the read image, by using a reference line group formed from at least one of the candidate lines identified,
wherein the document information identification processing includes:
first determination processing of determining whether a first-kind reference line group including at least one inside line is selectable from among the candidate lines, the at least one inside line being a candidate line running inside ends of the read image;
first identification processing of identifying the document information by using the first-kind reference line group, in a case that it is determined that the first-kind reference line group is selectable; and
second identification processing of identifying the document information by using a second-kind reference line group which includes at least one end line of the candidate lines, in a case that it is determined that the first-kind reference line group is not selectable, the at least one end line being a candidate line which forms one of the ends of the read image, a ratio of a total number of the at least one end line to a total number of the candidate lines included in the second-kind reference line group being higher than a ratio of the total number of the at least one end line to a total number of the candidate lines included in the first-kind reference line group.

9. The image processing apparatus according to claim 8, wherein, in a case that the candidate lines include the at least one inside line and the at least one end line, a line group which includes no end line but includes the at least one inside line is used as the first-kind reference line group in the first determination processing.

10. The image processing apparatus according to claim 8, wherein, in a case that the candidate lines include the at least one inside line and the at least one end line, a line group including the at least one end line and the at least one inside line is used as the second-kind reference line group in the second identification processing.

11. The image processing apparatus according to claim 8, wherein the document information identification processing includes:
    second determination processing of determining whether the second-kind reference line group is selectable from among the candidate lines; and
    third identification processing of identifying the document information by using a third-kind reference line group which only includes the at least one end line of the candidate lines, in a case that it is determined that the second-kind reference line group is not selectable, and
    wherein in a case that it is determined that the second-kind reference line group is selectable, the document information is identified by using the second-kind reference line group in the second identification processing.

12. The image processing apparatus according to claim 8, wherein the document information identification processing includes:
    first document information identification processing of identifying the document information, in a case that the read image data is generated by optically reading the document while moving the document relative to an optical element without moving the optical element; and
    second document information identification processing of identifying the document information, in a case that the read image data is generated by optically reading the document while moving the optical element relative to the document without moving the document,
    the second document information identification processing includes:
        determining whether the candidate lines include the at least one end line;
        in a case that the candidate lines include the at least one end line, identifying the document information by using a line group which includes the at least one end line; and
        in a case that the candidate lines include no end lines, identifying the document information by using a line group which only includes the at least one inside line.

13. The image processing apparatus according to claim 8, wherein, in the first determination processing, in a case that two candidate lines including the at least one inside line are selectable from among the candidate lines and the two candidate lines are a first candidate line and a second candidate line in a predefined parallel state or a predefined vertical state, it is determined that the first-kind reference line group including the first candidate line and the second candidate line is selectable.

14. The image processing apparatus according to claim 13,
    wherein, in the first identification processing, the first candidate line and the second candidate line are identified as candidate lines which represent at least a part of the edges of the document in the read image, and the processor is configured to further execute:
        processing of identifying, from among the candidate lines, a third candidate line and a fourth candidate line which are combined with the first candidate line and the second candidate line to form a rectangle, and
        processing of identifying an interior area of the rectangle formed from the first candidate line, the second candidate line, the third candidate line, and the fourth candidate line in the read image, as an area representing the document.

15. An image processing method comprising:
    read image data acquisition processing of acquiring read image data which is generated by optically reading a document and represents a read image including the document;
    line identification processing of identifying candidate lines which are candidates of lines representing edges of the document through analysis of the read image; and
    document information identification processing of identifying document information including at least one of a candidate line which represents at least a part of the edges of the document in the read image and an inclination of the document relative to the read image, by using a reference line formed from at least one of the candidate lines identified,
    wherein the document information identification processing includes:
        first determination processing of determining whether a first-kind reference line group including at least one inside line is selectable from among the candidate lines, the at least one inside line being a candidate line running inside ends of the read image;
        first identification processing of identifying the document information by using the first-kind reference line group, in a case that it is determined that the first-kind reference line group is selectable; and
        second identification processing of identifying the document information by using a second-kind reference line group which includes at least one end line of the candidate lines, in a case that it is determined that the first-kind reference line group is not selectable, the at least one end line being a candidate line which forms one of the ends of the read image, a ratio of a total number of the at least one end line to a total number of the candidate lines included in the second-kind reference line group being higher than a ratio of the total number of the at least one end line to a total number of the candidate lines included in the first-kind reference line group.

16. The image processing method according to claim 15, wherein, in a case that the candidate lines include the at least one inside line and the at least one end line, a line group which includes no end line but includes the at least one inside line is used as the first-kind reference line group in the first determination processing.

17. The image processing method according to claim 15, wherein, in a case that the candidate lines include the at least one inside line and the at least one end line, a line group including the at least one end line and the at least one inside line is used as the second-kind reference line group in the second identification processing.

18. The image processing method according to claim 15, wherein the document information identification processing includes:
    first document information identification processing of identifying the document information, in a case that the read image data is generated by optically reading the document while moving the document relative to an optical element without moving the optical element; and second document information identification processing of identifying the document information, in a case that the read image data is generated by optically reading the document while moving the optical element relative to the document without moving the document, the second document information identification processing includes:
- determining whether the candidate lines include the at least one end line;
- in a case that the candidate lines include the at least one end line, identifying the document information by using a line group which includes the at least one end line; and
- in a case that the candidate lines include no end lines, identifying the document information by using a line group which only includes the at least one inside line.

19. The image processing method according to claim 15, wherein, in the first determination processing, in a case that two candidate lines including the at least one inside line are selectable from among the candidate lines and the two candidate lines are a first candidate line and a second candidate line in a predefined parallel state or a predefined vertical state, it is determined that the first-kind reference line group including the first candidate line and the second candidate line is selectable.

20. The image processing method according to claim 19, wherein, in the first identification processing, the first candidate line and the second candidate line are identified as candidate lines which represent at least a part of the edges of the document in the read image, and the method further comprises:
- processing of identifying, from among the candidate lines, a third candidate line and a fourth candidate line which are combined with the first candidate line and the second candidate line to form a rectangle, and
- processing of identifying an interior area of the rectangle formed from the first candidate line, the second candidate line, the third candidate line, and the fourth candidate line in the read image, as an area representing the document.

* * * * *